US012762544B2

(12) United States Patent
Mee et al.

(10) Patent No.: US 12,762,544 B2
(45) Date of Patent: Oct. 13, 2026

(54) METHODS, DATA STRUCTURES, AND SYSTEMS FOR ORDERED DATA LOGGING

(71) Applicant: nChain Licensing AG, Zug (CH)

(72) Inventors: Andrew James Mee, London (GB); Ricky Charles Rand, London (GB); Jack Davies, London (GB)

(73) Assignee: nChain Licensing AG, Zug (CH)

( * ) Notice: Subject to any disclaimer, the term of this patent is extended or adjusted under 35 U.S.C. 154(b) by 200 days.

(21) Appl. No.: 17/799,566

(22) PCT Filed: Feb. 19, 2021

(86) PCT No.: PCT/IB2021/051428
§ 371 (c)(1),
(2) Date: Aug. 12, 2022

(87) PCT Pub. No.: WO2021/165907
PCT Pub. Date: Aug. 26, 2021

(65) Prior Publication Data

US 2023/0084490 A1 Mar. 16, 2023

(30) Foreign Application Priority Data

Feb. 19, 2020 (GB) ...................................... 2002285
Dec. 21, 2020 (GB) ...................................... 2020279
Feb. 18, 2021 (GB) ...................................... 2102314

(51) Int. Cl.
*G06Q 20/36* (2012.01)
*G06Q 20/22* (2012.01)

(52) U.S. Cl.
CPC ....... *G06Q 20/3678* (2013.01); *G06Q 20/223* (2013.01)

(58) Field of Classification Search
None
See application file for complete search history.

(56) References Cited

U.S. PATENT DOCUMENTS 10,565,358 B1 * 2/2020 Bertsch ................. H04L 63/123
11,398,911 B1 * 7/2022 Gunning ............. G07F 17/0014
(Continued)

FOREIGN PATENT DOCUMENTS

JP 2020532217 A 11/2020
WO 2018215872 11/2018
(Continued)

OTHER PUBLICATIONS

Andreas M. Antonopoulos (NPL: "Mastering Bitcoin" Dec. 2014) (Year: 2014).*
(Continued)

*Primary Examiner* — Jahed Ali
(74) *Attorney, Agent, or Firm* — Rowan P. Smith; Galvani Smith PLLC

(57) ABSTRACT

In one aspect, the present disclosure proposes methods, devices, systems, and data structures for implementing an ordered, append-only data logging system. In particular a method comprises creating a transaction of a first type comprising an input associated with a transaction output from a latest transaction in the set of transactions. Then creating a transaction of a second type. Finally submitting both the transaction of the second type and the transaction of the first type to the blockchain.

21 Claims, 19 Drawing Sheets

(56) References Cited

U.S. PATENT DOCUMENTS

| | | | | |
|---|---|---|---|---|
| 2014/0040209 | A1* | 2/2014 | Gokhale | H04L 41/08 707/648 |
| 2015/0172412 | A1* | 6/2015 | Escriva | G06F 16/2471 709/202 |
| 2019/0102758 | A1* | 4/2019 | Wright | G06Q 20/223 |
| 2019/0190697 | A1* | 6/2019 | Cunico | H04L 63/123 |
| 2019/0289068 | A1* | 9/2019 | Ma | H04L 67/63 |
| 2020/0027067 | A1* | 1/2020 | Hertzog | H04L 9/50 |
| 2020/0036530 | A1* | 1/2020 | Lampkins | H04L 9/085 |
| 2020/0050780 | A1* | 2/2020 | Uhr | G06F 21/64 |
| 2020/0104428 | A1* | 4/2020 | Bier | H04L 9/3239 |
| 2020/0162266 | A1* | 5/2020 | Miller | H04L 9/3239 |
| 2020/0169412 | A1* | 5/2020 | Certain | H04L 9/3236 |
| 2020/0193432 | A1* | 6/2020 | Millar | G06Q 30/0283 |
| 2020/0219053 | A1* | 7/2020 | Subramaniam | G06F 16/2291 |
| 2020/0250676 | A1* | 8/2020 | Sierra | G06Q 20/3825 |
| 2020/0349261 | A1* | 11/2020 | Koorella | G06F 21/6209 |
| 2020/0394177 | A1* | 12/2020 | Maurer | G06F 9/45508 |
| 2021/0089514 | A1* | 3/2021 | Werner | G06F 21/64 |
| 2021/0194673 | A1* | 6/2021 | Collins | H04L 9/0643 |
| 2021/0243011 | A1* | 8/2021 | Amin | G06Q 20/385 |

FOREIGN PATENT DOCUMENTS

| | | | | |
|---|---|---|---|---|
| WO | WO-2019043538 | A1 * | 3/2019 | G06Q 20/065 |
| WO | WO-2022049218 | A1 * | 3/2022 | G06Q 20/02 |

OTHER PUBLICATIONS

PCT/IB2021/051428 International Search Report and Written Opinion.

Andreas M Antonopoulos: "Mastering Bitcoin", Jul. 21, 2017 (Jul. 21, 2017), URL: https://www.oreilly.com/library/view/mastering-bitcoin-2nd/9781491954379/.

Alberto Garoffolo et al.: "Sidechains: Decoupled Consensus Between Chains", arxiv.org, Cornell University Library, 201 Olin Library Cornell University Ithaca, NY 14853, Oct. 17, 2018 (Oct. 17, 2018).

Bartoletti M., et al., "An Analysis of Bitcoin OP_Return Metadata," International Conference on Financial Cryptography and Data Security, Nov. 19, 2017, 18 pages.

* cited by examiner 1400
1402
Tx0
Create Payload
1406a
1404a
Tx1
Payload1
1406b
1404b
1420
Txn-3
Payloadn-3
1406c
1404c
Txn-2
Payloadn-2
1414
1406d
TxChangeOut
1418
PrevOutschange-in
1422
1424
1416
TxChangeIn
PrevOutschange-out
1406e
1404d
Txn-1
Payloadn-1
1406f
1426
Txfinal
Payloadfinal

1800

METHODS, DATA STRUCTURES, AND SYSTEMS FOR ORDERED DATA LOGGING

CROSS REFERENCE TO RELATED APPLICATIONS

This application is the U.S. National Stage of International Application No. PCT/IB2021/051428 filed on Feb. 19, 2021, which claims the benefit of United Kingdom Patent Application No. 2002285.1, filed on Feb. 19, 2020, United Kingdom Patent Application No. 2020279.2, filed on Dec. 21, 2020, and United Kingdom Patent Application No. 2102314.8, filed on Feb. 18, 2021, the contents of which are incorporated herein by reference in their entireties.

FIELD

The present disclosure relates methods, devices, systems, and data structures for storing data using a distributed ledger, i.e. a blockchain. More particularity, the present disclosure provides storage for ordered, append-only data items.

BACKGROUND

A blockchain refers to a form of distributed data structure, wherein a duplicate copy of the blockchain is maintained at each of a plurality of nodes in a distributed peer-to-peer (P2P) network (referred to below as a "blockchain network") and widely publicized. The blockchain comprises a chain of blocks of data, wherein each block comprises one or more transactions. Each transaction, other than so-called "coinbase transactions", points back to a preceding transaction in a sequence which may span one or more blocks up until one or more coinbase transactions. Coinbase transactions are discussed below. Transactions that are submitted to the blockchain network are included in new blocks. New blocks are created by a process often referred to as "mining", which involves each of a plurality of the nodes competing to perform "proof-of-work", i.e., solving a cryptographic puzzle based on a representation of a defined set of ordered and validated pending transactions waiting to be included in a new block of the blockchain. It should be noted that the blockchain may be pruned at a node, and the publication of blocks can be achieved through the publication of mere block headers.

The transactions in the blockchain are used to perform one or more of the following: to convey a digital asset (i.e. a number of digital tokens), to order a set of journal entries in a virtualised ledger or registry, to receive and process timestamp entries, and/or to time-order index pointers. A blockchain can also be exploited in order to layer additional functionality on top of the blockchain. Blockchain protocols may allow for storage of additional user data or indexes to data in a transaction. There is no pre-specified limit to the maximum data capacity that can be stored within a single transaction, and therefore increasingly more complex data can be incorporated. For instance, this may be used to store an electronic document in the blockchain, or audio or video data.

Nodes of the blockchain network (which are often referred to as "miners") perform a distributed transaction registration and verification process, which will be described in detail below. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g., a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the blockchain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e., a number of tokens. The detection and rejection of invalid transactions is enforced by the actions of competing nodes who act as agents of the network and are incentivised to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e., a reference) to such an output in a preceding transaction, and may further comprise an unlocking script for unlocking the locking script of the pointed-to output. So, consider a pair of transactions, call them a first and a second transaction (or "target" transaction). The first transaction comprises at least one output specifying an amount of the digital asset and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the nodes separate to the blockchain and is updated constantly.

Although blockchain technology is most widely known for the use of cryptocurrency implementation, digital entrepreneurs are exploring the use of both the cryptographic security system Bitcoin is based on, and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper-proof records of events, distributed processing etc.) while being more versatile in their applications.

One area of current research is the use of the blockchain for the implementation of "smart contracts". These are computer programs designed to automate the execution of the terms of a machine-readable contract or agreement. Unlike a traditional contract which would be written in natural language, a smart contract is a machine-executable program, which comprises rules that can process inputs in order to produce results, which can then cause actions to be performed dependent upon those results. Another area of blockchain-related interest is the use of 'tokens' (or 'coloured coins') to represent and transfer real-world entities via the blockchain. A potentially sensitive or secret item can be represented by the token, which has no discernible meaning or value. The token thus serves as an identifier that allows the real-world item to be referenced from the blockchain.

The above-mentioned examples or scenarios, whilst making use of the advantages of the blockchain to provide a permanent, tamper-proof record of events; requires a client to include or implement software and/or hardware for implementing functionality for managing digital assets, cryptographic keys for Elliptic Curve Digital Signature Algorithm (ECDSA), be able to implement blockchain transaction construction and have access to blockchain libraries. UK Patent Application No. 2002285.1 (filed in the name of nChain Holdings Limited on 19 Feb. 2020) describes a platform for one or more services associated with a blockchain, whereby data, or information associated with a client, may be simply, securely, and instantaneously written into, or obtained from the blockchain, by methods, devices, and systems which provide an application programming interface (API) for one or more services associated with a blockchain, without such clients needing to implement any processing or functionality for using the blockchain, while still being able to avail all advantages associated with the blockchain. For such platform, there is also a need to ensure that data, once entered into the blockchain using or via the platform, is not tampered with or modified and may be independently audited. Accordingly, the present disclosure describes one or more techniques to ensure that a sequence of events based on data associated with or provided via the platform and/or an arbitrary sequence of data items provided from an arbitrary client, is tamper resistant and can be independently traversed and verified.

SUMMARY OF THE INVENTION

In a first aspect, the present disclosure proposes methods, devices, data structures, and systems for implementing an ordered, append-only data storage. A data structure according this aspect comprising: a first transaction and a second transaction. The first transaction comprising: a first output and a representation of a first data item. The second transaction comprising: a further representation of the first data item, a representation of a second data item, a first input associated with the first output, and a second output.

A method associated with a set of transactions in a blockchain system according to the first aspect comprising the steps: receiving a request, the request triggering a representation of a data item to be stored on the blockchain, obtaining a latest transaction in the set of transactions, creating a new blockchain transaction comprising: an input associated with an output from the latest transaction; an output; the representation of the data item to be stored on the blockchain; and a reference to the latest transaction, submitting the transaction to the blockchain.

In a second aspect, the present disclosure proposes methods, devices, data structures, and systems for implementing an ordered, append-only data storage. A method according to the second aspect comprising the steps: creating a transaction of a first type comprising an input associated with a transaction output from a latest transaction in the set of transactions, creating a transaction of a second type, submitting the transaction of the second type to the blockchain, and submitting the transaction of the first type to the blockchain.

A data structure according to the second aspect, the data structure comprising: a transaction of a first type comprising an output comprising a first reference to a transaction of a second type, and the transaction of the second type.

A method according to the second aspect for traversing forward through a set of transactions comprising the steps: (a) obtaining a current transaction in the chain of transactions, (b) determining the current transaction is a transaction of a first type and based on the determination, conducting the following steps (i), (ii), and (iii): i. obtaining a reference to a transaction of a second type based on the transaction of the first type; ii. obtaining the transaction of the second type based on the reference to the transaction of the second type; and iii. continuing to step (c) with the transaction of the second type as the current transaction, (c) obtaining a current transaction identifier, (d) obtaining a further transaction that references the current transaction identifier, and (e) conducting steps (b), (c), (d), and (e) starting with the further transaction as the current transaction thereby creating a loop.

The second aspect optionally including features of the first aspect.

In a third aspect, the present disclosure proposes methods, devices, data structures, and systems for implementing an ordered, append-only data storage. A method according to the third aspect comprises the steps: creating a transaction of a second type, submitting the transaction of the second type to the blockchain, creating a transaction of a first type comprising an input associated with a transaction output from a latest transaction in the set of transactions and a reference to the transaction of the second type, submitting the transaction of the first type to the blockchain after the transaction of the second type is confirmed on the blockchain.

The third aspect optionally include features of the first and second aspects.

In a fourth aspect, the present disclosure proposes methods, devices, data structures, and systems for implementing an ordered, append-only data storage. A data structure comprising a transaction of the first type and a transaction of a second type, the transaction of the second type comprises at least one input. The transaction of the first type comprising a reference to the transaction of the second type, wherein the reference is based on at least one of the at least one input.

The fourth aspect optionally include features of the first, second, and third aspects.

In a fifth aspect, the present disclosure proposes methods, devices, data structures, and systems for implementing an ordered, append-only data storage. A data structure according to the fifth aspect comprising: a transaction of a first type comprising a first reference to a transaction of a second type, and the transaction of the second type comprising a second reference to the transaction of the first type and at least one input. Preferably, the first reference is based on the at least one input to the transaction of the second type. Preferably, the second reference is the transaction id of the transaction of the first type.

A method according to the fifth aspect for traversing backward though a data structure according to the fifth aspect comprising the steps: (a) obtaining a current transaction in the chain of transactions, (b) determining the current transaction is a transaction of a second type and based on the determination, conducting the following steps (i), (ii), (iii): i. obtaining a reference to a transaction of a first type based on the transaction of the second type, ii. obtaining the transaction of the first type based on the reference to the transaction of the first type, iii. continuing to step (c) with the transaction of the first type as the current transaction, (c) obtaining a transaction identifier of the preceding transaction from the current transaction, (d) obtaining a preceding transaction based on the transaction identifier of the preceding transaction, (e) conducting steps (b), (c), (d), and (e) starting with the preceding transaction as the current transaction thereby creating a loop.

The fifth aspect optionally include features of the first, second, third, and fourth aspects.

In a sixth aspect, the present disclosure proposes methods, devices, data structures, and systems for implementing an ordered, append-only data storage. A data structure according to the sixth aspect comprising: a transaction of a first type comprising a first reference to a change-in transaction, and the transaction of the second type comprising a second reference to the transaction of the first type. The first reference is based on at least one of the at least one input of the transaction of the second type. The second reference is based on at least one of the at least one input of the transaction of the first type.

The sixth aspect optionally include features of the first, second, third, fourth, and/or fifth aspects.

In a seventh aspect, the present disclosure proposes methods for implementing ordered, append-only data storage comprising transactions of a third type. The third type optionally being a rendezvous transaction.

A method for traversing forward through a set of blockchain transactions, comprising the steps: (a) obtaining a current transaction in the set of transactions, (b) determining the current transaction is a transaction of a third type and based on the determination, conducting the following steps (i), (ii), (iii), and (iv): (i) obtaining an index to the input that comprises a reference to the preceding transaction; (ii) obtaining the output associated with the input that comprises a reference to the preceding transaction; (iii) obtaining the next transaction based on the obtained output; and (iv) continuing to step (c) with the next transaction as the current transaction, (c) obtaining a current transaction identifier, (d) obtaining a further transaction that references the current transaction identifier, and (e) conducting steps (b), (c), (d), and (e) starting with the further transaction as the current transaction thereby creating a loop.

A method for traversing backwards through a set of blockchain transactions, comprising the steps: (a) obtaining a current transaction in the set of transactions, (b) determining the current transaction is a transaction of a third type and based on the determination, conducting the following steps (i), (ii), (iii), (iv): (i) obtaining an index to an input of the current transaction; (ii) obtaining a reference to the preceding transaction based on the obtained input of the current transaction; (iii) obtaining the preceding transaction based on reference; and (iv) continuing to step (c) with the preceding transaction as the current transaction, (c) obtaining a transaction identifier of the preceding transaction from the current transaction, (d) obtaining a preceding transaction based on the transaction identifier of the preceding transaction, (e) conducting steps (b), (c), (d), and (e) starting with the preceding transaction as the current transaction thereby creating a loop.

The seventh aspect optionally including features of the first, second, third, fourth, fifth, and sixth aspects. Preferably, the seventh aspect also comprises the embodiments related to the forwards and backwards traversal methods associated with aspects two, three, four, five, and six.

BRIEF DESCRIPTION OF THE FIGURES

Aspects and embodiments of the present disclosure will now be described, by way of example only, and with reference to the accompany drawings, in which.

DETAILED DESCRIPTION

Figure 1:
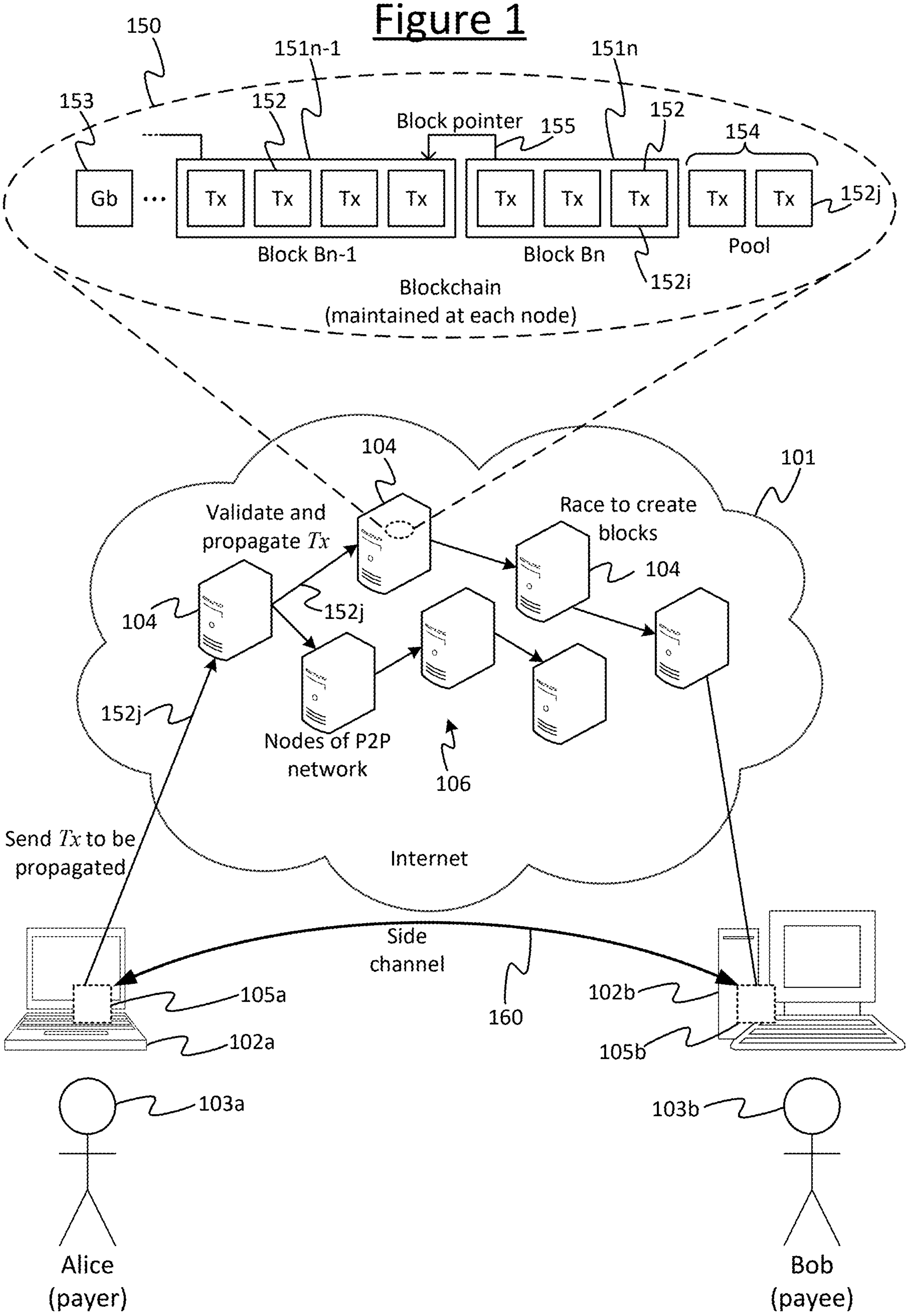
FIG. 1 is a schematic diagram, depicting an example system for implementing a blockchain.

Some specific components and embodiments of the disclosed method are now described by way of illustration with reference to the accompanying drawings, in which like reference numerals refer to like features.

Example System Overview

FIG. 1 shows an example system 100 for implementing a blockchain 150. The system 100 may comprise of a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as Application Specific Integrated Circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 101. As mentioned above, maintaining a copy of the blockchain 150 does not necessarily mean storing the blockchain 150 in full. Instead, the blockchain 150 may be pruned of data so long as each blockchain node 150 stores the blockheader (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set 154 of transactions 152 waiting to be incorporated into blocks 151. The ordered set 154 is often referred to as a “mempool”. This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction **152*j*, the (or each) input comprises a pointer referencing the output of a preceding transaction 152*i* in the sequence of transactions, specifying that this output is to be redeemed or “spent” in the present transaction 152*j*. In general, the preceding transaction could be any transaction in the ordered set 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence “preceding” herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i*** could equally be called the antecedent or predecessor transaction.

The input of the present transaction **152*j* also comprises the input authorisation, for example the signature of the user 103*a* to whom the output of the preceding transaction 152*i* is locked. In turn, the output of the present transaction 152*j* can be cryptographically locked to a new user or entity 103*b*. The present transaction 152*j* can thus transfer the amount defined in the input of the preceding transaction 152*i* to the new user or entity 103*b* as defined in the output of the present transaction 152*j*. In some cases a transaction 152 may have multiple outputs to split the input amount between multiple users or entities (one of whom could be the original user or entity 103*a*** in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when an entity, such as a user or machine, 103 wishes to enact a new transaction **152*j*, then the entity sends the new transaction from its computer terminal 102 to a recipient. The entity or the recipient will eventually send this transaction to one or more of the blockchain nodes 104 of the network 106** (which nowadays are typically servers or data centres, but could in principle be other user terminals).

It is also not excluded that the entity 103 enacting the new transaction 152*j* could send the transaction to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152*j* matches the expected signature, which depends on the previous transaction 152*i* in an ordered sequence of transactions 152. In such an output-based transaction protocol, this may comprise checking that the cryptographic signature or other authorisation of the entity 103 included in the input of the new transaction 152*j* matches a condition defined in the output of the preceding transaction 152*i* which the new transaction assigns, wherein this condition typically comprises at least checking that the cryptographic signature or other authorisation in the input of the new transaction 152*j* unlocks the output of the previous transaction 152*i* to which the input of the new transaction is linked to. The condition may be at least partially defined by a script included in the output of the preceding transaction 152*i*. Alternatively it could simply be fixed by the blockchain node protocol alone, or it could be due to a combination of these. Either way, if the new transaction 152*j* is valid, the blockchain node 104 forwards it to one or more other blockchain nodes 104 in the blockchain network 106. These other blockchain nodes 104 apply the same test according to the same blockchain node protocol, and so forward the new transaction 152*j* on to one or more further nodes 104, and so forth. In this way the new transaction is propagated throughout the network of blockchain nodes 104.

In an output-based model, the definition of whether a given output (e.g. UTXO) is assigned is whether it has yet been validly redeemed by the input of another, onward transaction 152*j* according to the blockchain node protocol. Another condition for a transaction to be valid is that the output of the preceding transaction 152*i* which it attempts to assign or redeem has not already been assigned/redeemed by another transaction. Again if not valid, the transaction 152*j* will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered set 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle.

Typically this comprises searching for a "nonce" value such that when the nonce is concatenated with a representation of the ordered set of transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151*n* pointing back to the previously created block 151*n*-1 in the chain. A significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the ordered set of yet to be published transactions 154 at any given time, depending on when they started searching for a solution or the order in which the transactions were received. Whoever solves their respective puzzle first defines which transactions 152 are included in the next new block 151*n* and in which order, and the current set 154 of unpublished transactions is updated. The blockchain nodes 104 then continue to race to create a block from the newly defined outstanding ordered set of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to assign an accepted amount of the digital asset in a new special kind of transaction which distributes a defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction". It typically forms the first transaction of the new block 151*n*. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151*n* in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network but do not participate in validating, constructing or propagating transactions and blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103*a* and his/her respective computer equipment 102*a*, and a second party 103*b* and his/her respective computer equipment 102*b*. It will be understood that many more such parties 103 and their respective computer equipment 102 may be present and participating in the system 100, but for convenience they are not illustrated. Each party 103 may be an individual or an organization. Purely by way of illustration the first party 103*a* is referred to herein as Alice and the second party 103*b* is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorize (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152*j* to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152*j*, it handles it in accordance with the blockchain node protocol and its respective role. This comprises first checking whether the newly received transaction 152*j* meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152*j* passes the test for being deemed valid (i.e. on condition that it is "validated"), any blockchain node 104 that receives the transaction 152*j* will add the new validated transaction 152 to the ordered set of transactions 154 maintained at that blockchain node 104. Further, any blockchain node 104 that receives the transaction 152*j* will propagate the validated transaction 152 onward to one or more other blockchain nodes 104 in the network 106. Since each blockchain node 104 applies the same protocol, then assuming the transaction 152*j* is valid, this means it will soon be propagated throughout the whole network 106.

Once admitted to the ordered set of transactions 154 maintained at a given blockchain node 104, that blockchain node 104 will start competing to solve the proof-of-work puzzle on the latest version of their respective ordered set of transactions 154 including the new transaction 152 (recall that other blockchain nodes 104 may be trying to solve the puzzle based on a different ordered set of transactions 154, but whoever gets there first will define the ordered set of transactions that are included in the latest block 151. Eventually a blockchain node 104 will solve the puzzle for a part of the ordered set 154 which includes Alice's transaction 152*j*). Once the proof-of-work has been done for the ordered set 154 including the new transaction 152*j*, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

UTXO-Based Model

Figure 2:
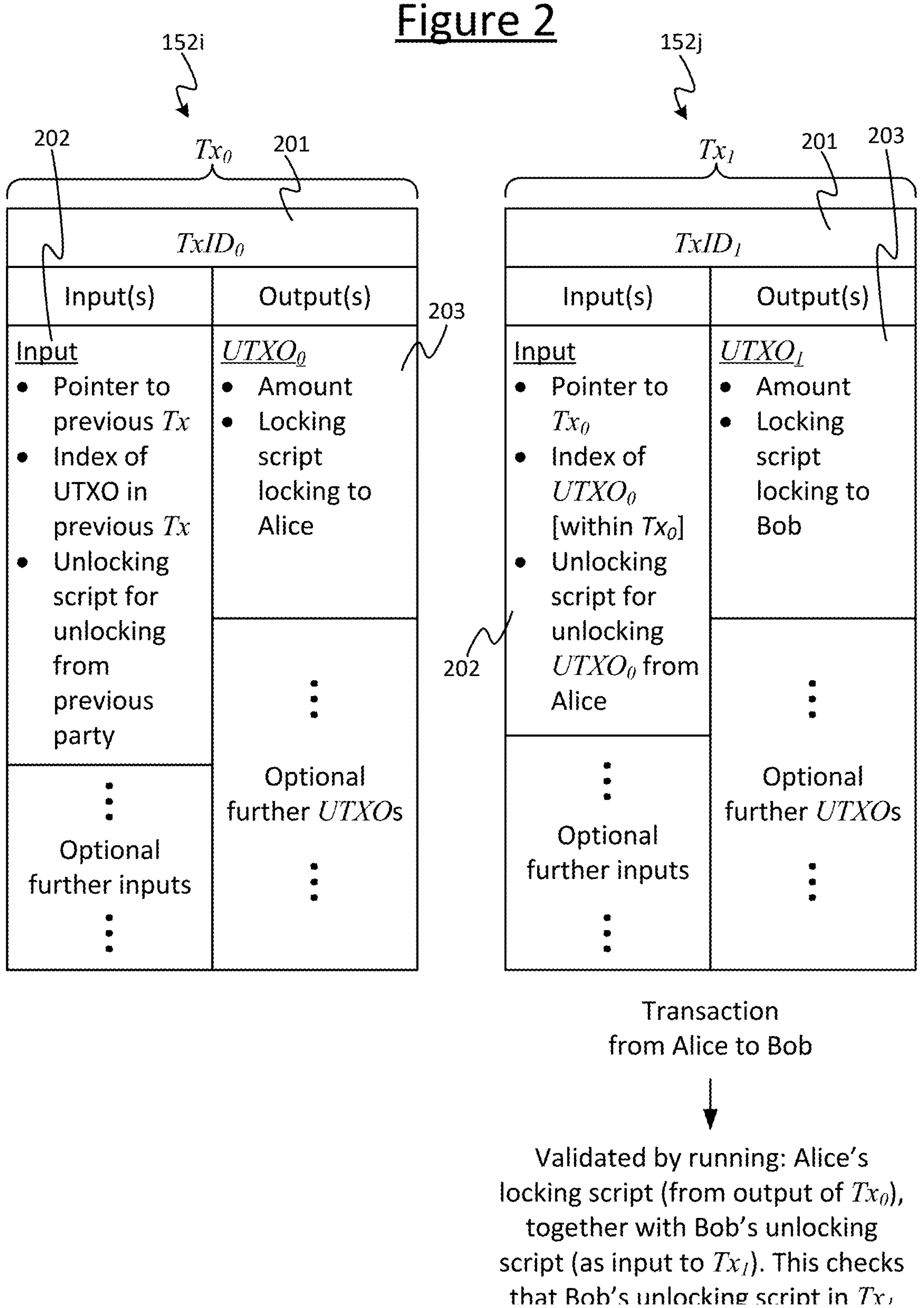
FIG. 2 is a schematic diagram, depicting example transactions used in a blockchain system.

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103*a* wishes to create a transaction 152*j* transferring an amount of the digital asset in question to Bob 103*b*. In FIG. 2 Alice's new transaction 152*j* is labelled "Tx1". It takes an amount of the digital asset that is locked to Alice in the output 203 of a preceding transaction 152*i* in the sequence, and transfers at least some of this to Bob. The preceding transaction 152*i* is labelled "Tx0" in FIG. 2. Tx0 and Tx1 are just arbitrary labels. They do not necessarily mean that Tx0 is the first transaction in the blockchain 151, nor that Tx1 is the immediate next transaction in the pool 154. Tx1 could point back to any preceding (i.e. antecedent) transaction that still has an unspent output 203 locked to Alice.

The preceding transaction Tx0 may already have been validated and included in a block 151 of the blockchain 150 at the time when Alice creates her new transaction Tx1, or at least by the time she sends it to the network 106. It may already have been included in one of the blocks 151 at that time, or it may be still waiting in the ordered set 154 in which case it will soon be included in a new block 151. Alternatively Tx0 and Tx1 could be created and sent to the network 106 together, or Tx0 could even be sent after Tx1 if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction Tx0 comprises a particular UTXO, labelled here UTXO0. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, UTXO0 in the output 203 of Tx0 comprises a locking script [Checksig PA] which requires a signature Sig PA of Alice in order for UTXO0 to be redeemed (strictly, in order for a subsequent transaction attempting to redeem UTXO0 to be valid). [Checksig PA] contains a representation (i.e. a hash) of the public key PA from a public-private key pair of Alice. The input 202 of Tx1 comprises a pointer pointing back to Tx1 (e.g. by means of its transaction ID, TxID0, which in embodiments is the hash of the whole transaction Tx0). The input 202 of Tx1 comprises an index identifying UTXO0 within Tx0, to identify it amongst any other possible outputs of Tx0. The input 202 of Tx1 further comprises an unlocking script <Sig PA> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction Tx1 arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig PA><PA>|| [Checksig PA]

where "||" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key PA of Alice, as included in the locking script in the output of Tx0, to authenticate that the unlocking script in the input of Tx1 contains the signature of Alice signing the expected portion of data. The expected portion of data itself (the "message") also needs to be included in order to perform this authentication. In embodiments the signed data comprises the whole of Tx1 (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in Tx1 meets the one or more conditions specified in the locking script of Tx0 (so in the example shown, if Alice's signature is provided in Tx1 and authenticated), then the blockchain node 104 deems Tx1 valid. This means that the blockchain node 104 will add Tx1 to the ordered set of transactions 154. The blockchain node 104 will also forward the transaction Tx1 to one or more other blockchain nodes 104 in the network 106, so that it will be propagated throughout the network 106. Once Tx1 has been validated and included in the blockchain 150, this defines UTXO0 from Tx0 as spent. Note that Tx1 can only be valid if it spends an unspent transaction output 203. If it attempts to spend an output that has already been spent by another transaction 152, then Tx1 will be invalid even if all the other conditions are met. Hence the blockchain node 104 also needs to check whether the referenced UTXO in the preceding transaction Tx0 is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in UTXO0 in Tx0 can be split between multiple UTXOs in Tx1. Hence if Alice does not want to give Bob all of the amount defined in UTXO0, she can use the remainder to give herself change in a second output of Tx1, or pay another party.

In practice Alice will also usually need to include a fee for the bitcoin node that publishes her transaction 104. If Alice does not include such a fee, Tx0 may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to UTXO0 is the only input to Tx1, and Tx1 has only one output UTXO1. If the amount of the digital asset specified in UTXO0 is greater than the amount specified in UTXO1, then the difference may be assigned by the node 104 that publishes the block containing UTXO1. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150.

There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e., not using the exact language). For example, one may use operation codes (opcodes) to represent a particular function. "OP_. . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g., the data could comprise a document which it is desired to store in the blockchain.

Using OP_RETURN in this manner is a specific example using a provably unspendable script for use on a Bitcoin based blockchain system. A person skilled in the art will appreciate that different blockchain systems will have different mechanisms and data formats for ensuring scripts are unspendable and/or storing data in a transaction.

Typically, an input of a transaction contains a digital signature corresponding to a public key PA. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

As shown in FIG. 1, the client application on each of Alice and Bob's computer equipment **102*a*, 120*b*, respectively, may comprise additional communication functionality. This additional functionality enables Alice 103*a* to establish a separate side channel 160 with Bob 103*b* (at the instigation of either party or a third party). The side channel 160 enables exchange of data separately from the blockchain network. Such communication is sometimes referred to as "off-chain" communication. For instance, this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively, or additionally, the side channel 160** may be used to exchange any other transaction related data, such as keys, negotiated amounts or terms, data content, etc.

The side channel 160 may be established via the same packet-switched network 101 as the blockchain network 106. Alternatively or additionally, the side channel 160 may be established via a different network such as a mobile cellular network, or a local area network such as a local wireless network, or even a direct wired or wireless link between Alice and Bob's devices **102*a*, 102*b*. Generally, the side channel 160 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 160. Note therefore that if it is said that Alice and Bob exchange certain pieces of information or data, or such like, over the side channel 160**, then this does not necessarily imply all these pieces of data have to be send over exactly the same link or even the same type of network.

Client Software

Figure 3A:
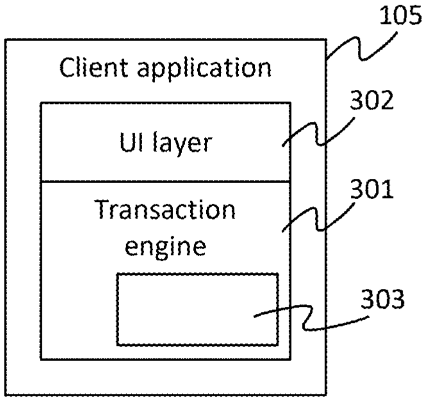
FIGS. 3A and 3B are diagrams depicting an example wallet system and user interface.

FIG. 3A illustrates an example implementation of the client application 105 for implementing embodiments of the presently disclosed scheme. The client application 105 comprises a transaction engine 301 and a user interface (UI) layer 302. The transaction engine 301 is configured to implement the underlying transaction-related functionality of the client 105, such as to formulate transactions 152, receive and/or send transactions and/or other data over the side channel 160, and/or send transactions to one or more nodes 104 to be propagated through the blockchain network 106, in accordance with the schemes discussed above and as discussed in further detail shortly.

The UI layer 302 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example the user output means could comprise one or more display screens (touch or non-touch screen) for providing a visual output, one or more speakers for providing an audio output, and/or one or more haptic output devices for providing a tactile output, etc. The user input means could comprise for example the input array of one or more touch screens (the same or different as that/those used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

Note: whilst the various functionality herein may be described as being integrated into the same client application 105, this is not necessarily limiting and instead they could be implemented in a suite of two or more distinct applications, e.g. one being a plug-in to the other or interfacing via an API (application programming interface). For instance, the functionality of the transaction engine 301 may be implemented in a separate application than the UI layer 302, or the functionality of a given module such as the transaction engine 301 could be split between more than one application. Nor is it excluded that some or all of the described functionality could be implemented at, say, the operating system layer. Where reference is made anywhere herein to a single or given application 105, or such like, it will be appreciated that this is just by way of example, and more generally the described functionality could be implemented in any form of software.

Figure 3B:
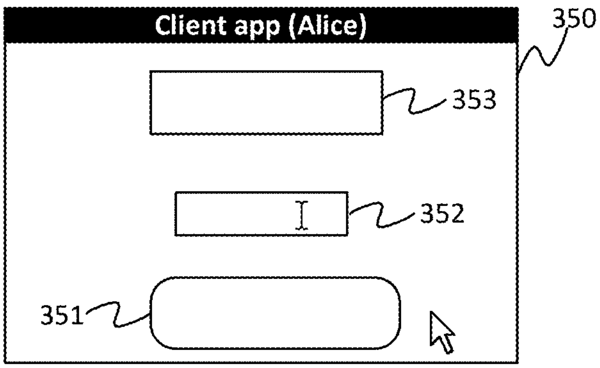

FIG. 3B gives a mock-up of an example of the user interface (UI) 600 which may be rendered by the UI layer 302 of the client application 105*a* on Alice's equipment 102*a*. It will be appreciated that a similar UI may be rendered by the client 105*b* on Bob's equipment 102*b*, or that of any other party.

By way of illustration FIG. 3B shows the UI 350 from Alice's perspective. The UI 350 may comprise one or more UI elements 351, 352, 352 rendered as distinct UI elements via the user output means.

For example, the UI elements may comprise one or more user-selectable elements 351 which may be, such as different on-screen buttons, or different options in a menu, or such like. The user input means is arranged to enable the user 103 (in this case Alice 103*a*) to select or otherwise operate one of the options, such as by clicking or touching the UI element on-screen, or speaking a name of the desired option (N.B. the term "manual" as used herein is meant only to contrast against automatic, and does not necessarily limit to the use of the hand or hands). The options enable the user (Alice) to . . . .

Alternatively or additionally, the UI elements may comprise one or more data entry fields 352, through which the user can . . . . These data entry fields are rendered via the user output means, e.g. on-screen, and the data can be entered into the fields through the user input means, e.g. a keyboard or touchscreen. Alternatively the data could be received orally for example based on speech recognition.

Alternatively or additionally, the UI elements may comprise one or more information elements 353 output to output information to the user. E.g. this/these could be rendered on screen or audibly.

It will be appreciated that the particular means of rendering the various UI elements, selecting the options and entering data is not material. The functionality of these UI elements will be discussed in more detail shortly. It will also be appreciated that the UI 350 shown in FIG. 3 is only a schematized mock-up and in practice it may comprise one or more further UI elements, which for conciseness are not illustrated.

Node Software

Figure 4:
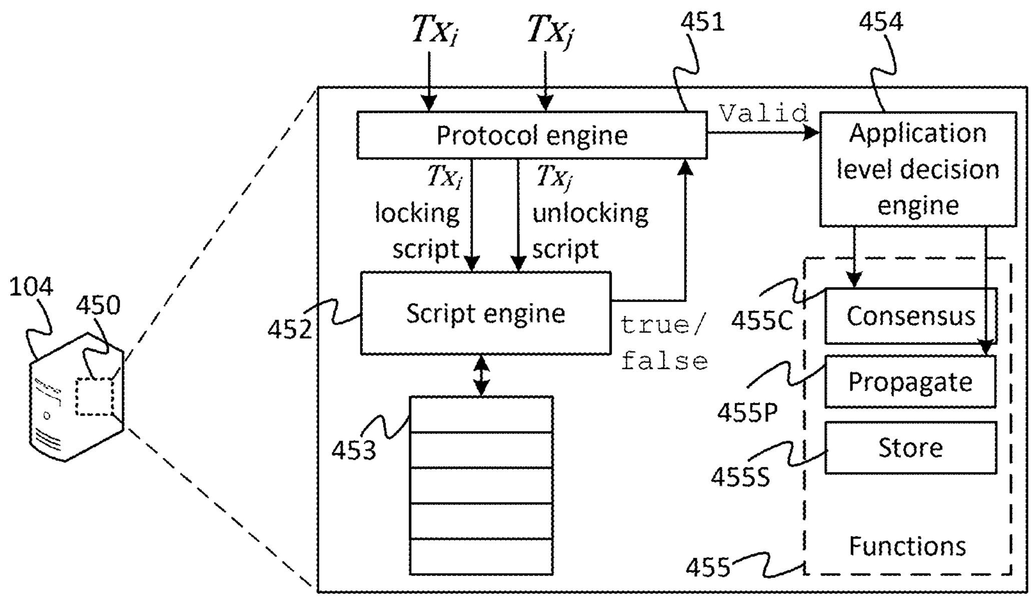
FIG. 4 is a schematic diagram depicting an example blockchain node comprising software modules.

FIG. 4 illustrates an example of the node software 450 that is run on each blockchain node 104 of the network 106, in the example of a UTXO- or output-based model. Note that another entity may run node software 450 without being classed as a node 104 on the network 106, i.e. without performing the actions required of a node 104. The node software 450 may contain, but is not limited to, a protocol engine 451, a script engine 452, a stack 453, an application-level decision engine 454, and a set of one or more blockchain-related functional modules 455. Each node 104 may run node software that contains, but is not limited to, all three of: a consensus module 455C (for example, proof-of-work), a propagation module 455P and a storage module 455S (for example, a database). The protocol engine 401 is typically configured to recognize the different fields of a transaction 152 and process them in accordance with the node protocol. When a transaction 152*j* ($Tx_j$) is received having an input pointing to an output (e.g. UTXO) of another, preceding transaction 152*i* ($Tx_{m-1}$), then the protocol engine 451 identifies the unlocking script in $Tx_j$ and passes it to the script engine 452. The protocol engine 451 also identifies and retrieves $Tx_i$ based on the pointer in the input of $Tx_j$. $Tx_i$ may be published on the blockchain 150, in which case the protocol engine may retrieve $Tx_i$ from a copy of a block 151 of the blockchain 150 stored at the node 104. Alternatively, $Tx_j$ may yet to have been published on the blockchain 150. In that case, the protocol engine 451 may retrieve $Tx_i$ from the ordered set 154 of unpublished transactions maintained by the node 104. Either way, the script engine 451 identifies the locking script in the referenced output of $Tx_i$ and passes this to the script engine 452.

The script engine 452 thus has the locking script of $Tx_i$ and the unlocking script from the corresponding input of $Tx_j$. For example, transactions labelled $Tx_0$ and $Tx_1$ are illustrated in FIG. 2, but the same could apply for any pair of transactions. The script engine 452 runs the two scripts together as discussed previously, which will include placing data onto and retrieving data from the stack 453 in accordance with the stack-based scripting language being used (e.g. Script).

By running the scripts together, the script engine 452 determines whether or not the unlocking script meets the one or more criteria defined in the locking script—i.e. does it "unlock" the output in which the locking script is included? The script engine 452 returns a result of this determination to the protocol engine 451. If the script engine 452 determines that the unlocking script does meet the one or more criteria specified in the corresponding locking script, then it returns the result "true". Otherwise it returns the result "false".

In an output-based model, the result "true" from the script engine 452 is one of the conditions for validity of the transaction. Typically there are also one or more further, protocol-level conditions evaluated by the protocol engine 451 that must be met as well; such as that the total amount of digital asset specified in the output(s) of $Tx_j$ does not exceed the total amount pointed to by its inputs, and that the pointed-to output of $Tx_i$ has not already been spent by another valid transaction. The protocol engine 451 evaluates the result from the script engine 452 together with the one or more protocol-level conditions, and only if they are all true does it validate the transaction $Tx_j$. The protocol engine 451 outputs an indication of whether the transaction is valid to the application-level decision engine 454. Only on condition that $Tx_j$ is indeed validated, the decision engine 454 may select to control both of the consensus module 455C and the propagation module 455P to perform their respective blockchain-related function in respect of $Tx_j$. This comprises the consensus module 455C adding $Tx_j$ to the node's respective ordered set of transactions 154 for incorporating in a block 151, and the propagation module 455P forwarding $Tx_j$ to another blockchain node 104 in the network 106. Optionally, in embodiments the application-level decision engine 454 may apply one or more additional conditions before triggering either or both of these functions. E.g. the decision engine may only select to publish the transaction on condition that the transaction is both valid and leaves enough of a transaction fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model, a result of "true" could be indicated by a combination of an implicit, protocol-level validation of a signature and an additional affirmative output of a smart contract (the overall result being deemed to signal true if both individual outcomes are true).

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However, it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In non-preferred embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

Ordered, Append-Only Data Storage

The use of the blockchain for high-volume, data-oriented applications has increased significantly in recent years. With this increase, the demand for robust layer-2 protocols for structuring, encoding and formatting the data payloads that are published to the blockchain has also increased commensurately. Here, layer-2 means secondary protocols, frameworks, data structures etc that are built on top of an existing blockchain system or systems. The aspects described herein would be considered as layer-2 protocols. Layer-1 would refer to Bitcoin, Bitcoin SV, or other underlying blockchain technologies.

It is typical for blockchain-based applications involving large amounts of data to require a data schema or structuring mechanism that allows many data-carrier transactions to be linked to one another. This is particularly pertinent to applications (e.g. in supply chains) where many events and/or data may need to be linked to each other in a linearised sequence.

The maintenance and tracking of a sequence of events and/or ordered data items can be aided by unique references, whereby one data-carrier transaction will explicitly reference another to ensure that the two transactions can be related to one another by an observer of the blockchain.

Event Stream and the Chain of Dust

Figure 5:
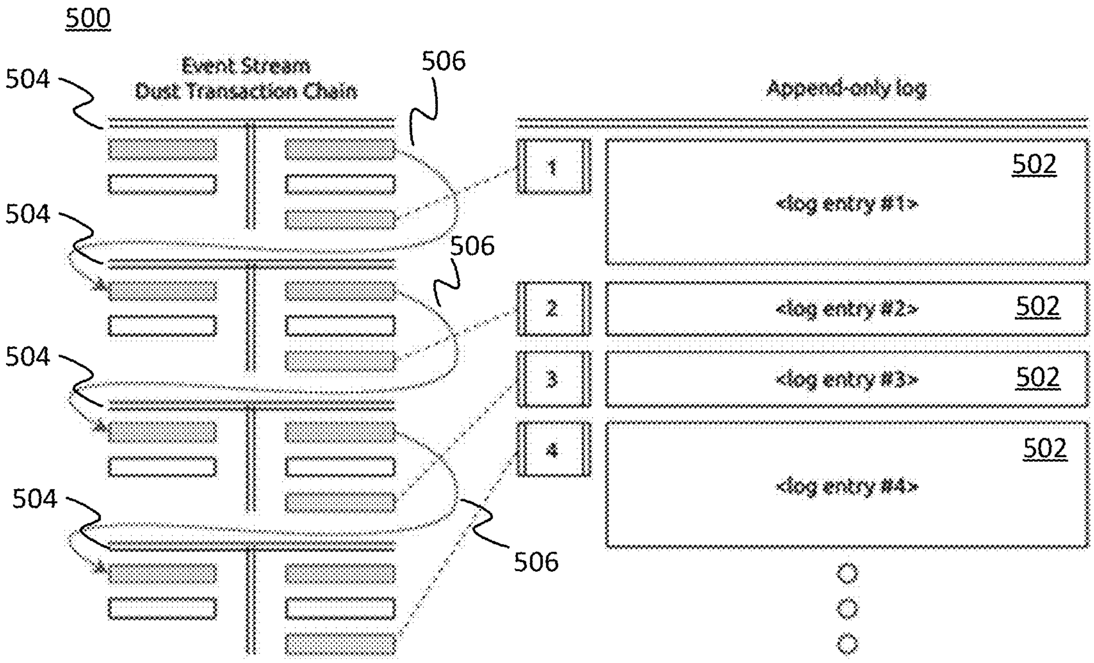
FIG. 5 is a schematic diagram depicting an overview of a chain of transaction storing log entries and the corresponding log entries according to a first aspect.

FIG. 5 relates to a first aspect of the present disclosure and illustrates the basic data structure and paradigm of an ordered, append-only data storage system. This can also be described as a data logging system. The particular system shown in FIG. 5 is an Event Stream system for logging events. By way of example, the Event Stream is used throughout for illustrative purposes, however a skilled person will appreciate that the proposed systems and aspects described herein may be used with data items generally and with ordered, append-only data item logging or storage systems. A data item may refer to data in a complete form, for example sensor data or a document. Alternatively, a data item refers to a hash of actual data. The use of a hash instead of the data itself advantageously provides a proof of existence for the data without requiring the data (which may large, even too large for a transaction) to be stored on a transaction.

Each event 502 in the append-only log is mapped to a blockchain transaction 504, and the sequence of blockchain transactions are ordered and linked 506 using a 'chain of dust'. The data associated with each event is stored in a payload (described below) as a part of each transaction. The data payload is held in an un-spendable OP_RETURN output of the transaction. This is a Script opcode which can be used to write arbitrary data on blockchain and also to mark a transaction output as invalid. As another example, OP_RETURN is an opcode of the Script language for creating an un-spendable output of a transaction that can store data such as metadata within the transaction, and thereby record the metadata immutably on the blockchain.

A chain of dust is an unbroken chain of Bitcoin inputs and outputs, which are used here to impose a spending dependency of each blockchain transaction in the sequence on its immediate predecessor. The "dust" in the context of blockchain transaction for the present disclosure is understood to be a spendable transaction for a digital asset or cryptocurrency that has an output of low or minuscule value, i.e. the value may be much less that fees for mining the output in the blockchain.

The use of dust outputs in the transactions is advantageous and key for maintaining an immutable sequential record of all transactions as they occur for an ordered, append-only data storage system, such as an Event Stream. This is because, although by posting transactions to the blockchain all blockchain transactions would be time-stamped and remain in a particular order once they are confirmed on or added to the blockchain, this does not guarantee preservation of their sequential order. This is because transactions might be mined into blocks at different times and/or the transactions are in a different order even within the same block. The use of dust outputs that are spent by the first input of the next transaction in the sequence advantageously ensures that the order of the transaction is chronologically tracked and a tamper-proof record of both the events themselves and the sequential ordering of the events is created. This is because once mined into a block, the payment of dust from a previous transaction to a next one in the sequence ensures that, in alignment with Bitcoin protocol rules, the sequence of embedded data carrier elements, called payloads and discussed below, cannot be reordered, and no insertions or deletions may occur, which could change it without it being immediately obvious that the event stream has been compromised. In some embodiments, a double spend prevention mechanism inherent to the Bitcoin protocol ensures that the movement of cryptocurrency (e.g. dust) between different transaction inputs and outputs remains in topological order. The chaining of dust transactions takes advantage of the topological ordering to provide inter and intra block transaction (and therefore associated events and data) order preservation. Thus, this improves the integrity of ordered, append only data item storage.

In this manner, the blockchain transactions 504 form a directed graph of transactions. It should be noted that the direction of the graph can be considered as one-way, directed from the previous transaction in the sequence to the next, as indicated by the edges 506. While the arrows on edges 506 in FIG. 5 indicate a transaction pointing to the next, the spending relationship in a Bitcoin transaction is actually from one transaction to the preceding. This graph is created by the spending relationship between transactions. These spending relationships can be considered as a type of reference.

Backward Referencing in the Chain of Dust

Figure 6A:
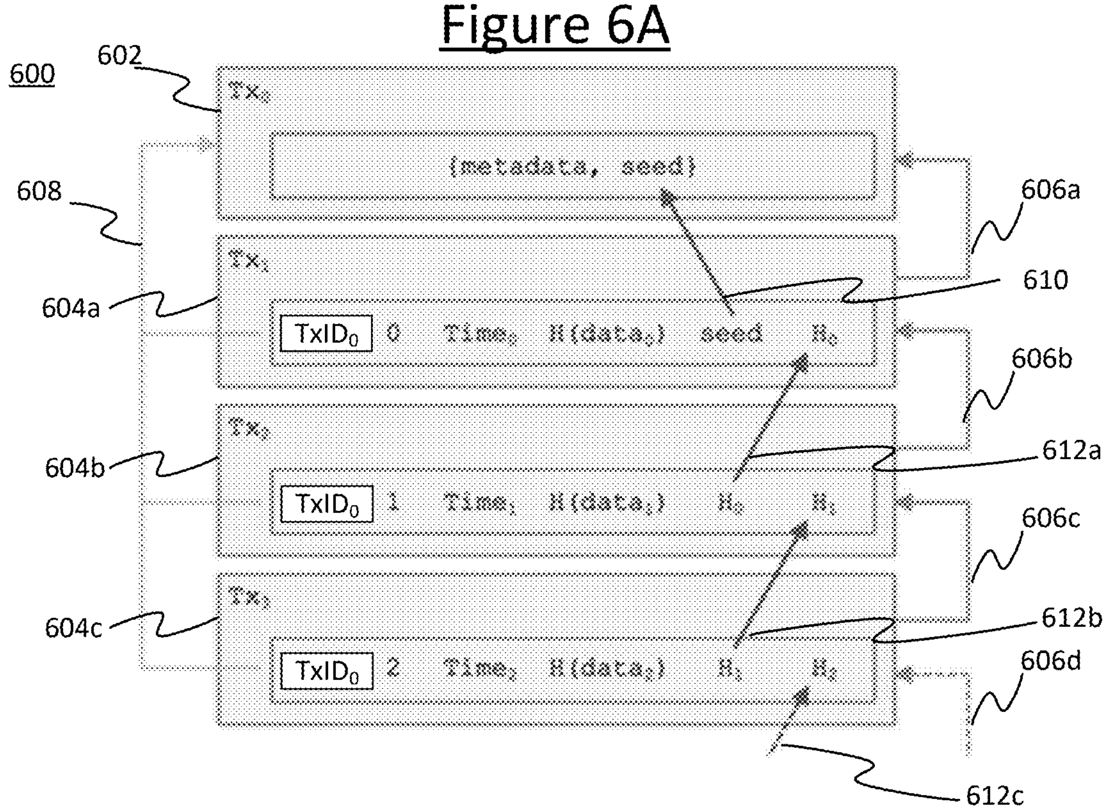
FIGS. 6A, 6B, and 6C are schematic diagrams depicting the data structures according to a first aspect.

FIG. 6A relates to the first aspect of the present disclosure and a chain of transactions 600 is shown. The chain of transactions comprises a number of transactions 602, 604*a*, 604*b*, 604*c* that are interrelated to each other. The first transaction 602 is labelled as $Tx_0$ and comprises metadata about the chain and a seed number. The chain also comprises a number of append transactions 604*a*, 604*b*, 604*c* and preferably they comprise data items to be included in the blockchain. The data items are preferably stored as a part of the payload described below. The append transactions 604*a*, 604*b*, 604*c* also comprise an input associated with an output from the transaction preceding them, thus establishing a spending relationship 606*a*, 606*b*, 606*c*, 606*d*. This input spends the transaction output from the previous transaction. By way of example with reference to the Bitcoin protocol and as described under the heading "UTXO-Based Model" above and with reference to FIG. 2, the outputs are Unspent Transaction Outputs (UTXOs) and the inputs comprise references to the UTXOs. Thus, each transaction (except the first) comprises a backward reference 606*a*, 606*b*, 606*c*, 606*d* to the previous transaction in the chain of dust via a spending relationship. The initial transaction does comprise an input comprising a backward reference to a funding UTXO as explained below with reference to FIG. 6C. This funding UTXO is not considered part of the chain of dust however as it does not store data or metadata relating to the chain of dust.

Optionally, two further backward references are comprised in the append transactions 604*a*, 604*b*, 604*c*. A second backward reference 608 to the first transaction is depicted in FIG. 6A by the arrows on the left-hand side. This reference preferably takes the form of the transaction id of the first transaction. A third backward reference 610, 612*a-c* takes two forms depending where the transaction is in the chain. For the second transaction 604*a* in the chain, the third backward reference 610 is the seed present in the first transaction. For all other transactions after the second transaction, the reference 612*a-c* takes the form of a hash of a preimage of data within the preceding transaction.

The third backward reference 610, 612*a-c* is to protect payloads from alteration by ensuring that each payload is dependent on a section of the previous payload. In particular, each payload comprises the stream digest of the preceding payload. This also has the effect of creating backward references that allow a user to trace the stream of events backwards by following these stream digest references. These third backward references 610, 612*a-c* refer to the same objects (the same preceding transaction) as the spending references 606*a-d* but use a different reference object.

The payload of the append transactions 604*a*, 604*b*, 604*c* optionally has the form of: $Payload_n$=[$preimage_n$] [stream-$Digest_n$] [ . . . ]. Here, the subscript n is used to signify the present transaction and n−1 is the preceding transaction.

Preferably, the payload is stored in the script of an output of the transaction in the form: OP_FALSE OP_RETURN_OP_PUSHDATA1<preimage>0x20<stream Digest> [0x20 <data digest>|OP_PUSHDATAN <data>]

The preimage comprises metadata of the current transaction and previous transaction. The preimage optionally comprises any one or more of the following fields:

- txidcreate: A reference 608 to the first transaction in the chain, preferably the transaction id of the first transaction in the chain,
- index: An index of the data or event,
- whenRecorded: A time associated with the creation of the transaction and/or data item, dataDigest$_n$: A hash of the data, where optionally the data is stored in the event data representation section of the payload ([ . . . ]) or optionally stored off-chain, and streamDigest$_{n-1}$: A hash 612*a*, 612*b*, 612*c* of the preimage of the preceding transaction (also described as the stream digest of the preceding transaction, or the stream digest reference) or the seed 610 of the first transaction (if the transaction is the second transaction in the chain as the first transaction does not comprise a streamDigest). As discussed above, this can function as the third reference to the preceding transaction.

The stream digest (streamDigest) is a hash of the preimage (preimage).

The event data representation section of the payload ([ . . . ]) optionally comprises the data item to be stored on the blockchain. The data item may be one of:

data itself to be stored on the blockchain, a hash of the data, a subsection of the data to store on the blockchain, or nothing and/or empty.

If the data item to be stored is a hash of some data and there is no intention of storing the data itself in the transaction, then the event data representation section of the payload may be empty. The data item (the hash of the data) in this case is already stored in the dataDigest part of the preimage.

The hash 612*a*, 612*b*, 612*c* of the preimage of the preceding transaction can be considered a further reference to the preceding transaction. This hash can be used to traverse the chain of transactions and/or to validate the preceding transaction.

If the data to be stored on the blockchain is too large for the payload and/or makes the transaction too large for the blockchain system, the data may be split into sub-sections. Thus, the data is stored across a number of payloads (and therefore transactions). The preimage optionally comprises a further field to track the total number of sub-sections and the index of the current sub-section present in the event data representation section. Other methods of managing splitting data over multiple transactions are known. A first alternative may use a unique ID for the data, so any chunks of the data can all use the same ID to signify they are related. A second alternative may use pointers to other locations where the (rest of) the data is stored, e.g. one Tx storing half the data could include the TxID of another Tx that stores the other half, and include this TxID in its [ . . . ], and vice versa. A person skilled in the art will appreciate that further methods of splitting data across transactions are possible.

Figure 6B:
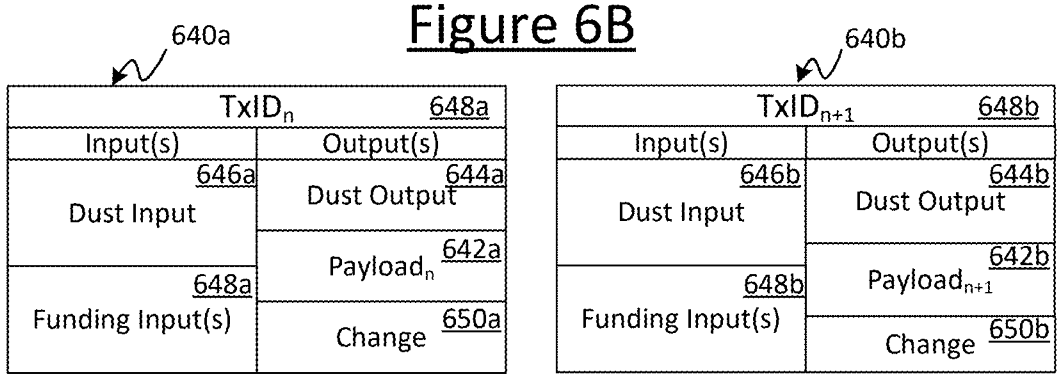
Figure 6C:
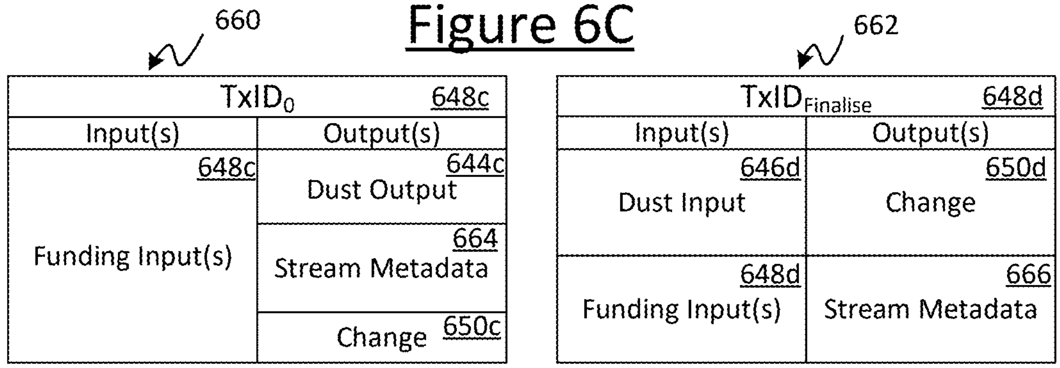

Referring to FIGS. 6B and 6C, example blockchain transaction formats for the data append transactions 640*a*, 640*b*, and the initial 660 and final 662 transaction are shown. As these are blockchain transactions, they are similar in structure to those 152*i*, 152*j* described with reference to FIG. 2 however comprise specific components to relevant to the present aspect of the invention. The exact order of the inputs and outputs is not specific and alternative orderings may be used. The ordering is preferably consistent on a given chain.

FIG. 6B shows two data append transactions 640*a*, 640*b*. These example data append transactions 640*a*, 640*b* come after one another chronologically and in the chain of dust. The dust output 644*a* of the first transaction 640*a* is referenced in (i.e., spent by) the dust input 646*b* of the second transaction 640*b*. The dust input 646*b* of the second transaction 640*b* reference to the dust output 644*a* of the first transaction 640*a* comprises both the transaction id 648*a* of the first transaction and the index of the UTXO, which is 0 in this example case (because it's the first in the list and zero indexing is used).

All of the transactions 640*a*, 640*b*, 660, 662 comprise a funding inputs 648*a*, 648*b*, 648*c*, 648*d*. These funding inputs 648*a*, 648*b*, 648*c*, 648*d* are provided by a computing device managing creating and submitting these transactions to the blockchain. The computing device is optionally a funding service and is part of the services as described with reference to FIG. 16. The total value of the funding input(s) is selected to cover the transaction fee (sometimes called the miner's fee) to help ensure miners will pick up the transaction and include it in a block. The funding service may provide one or more input(s) to ensure the total value is the input(s) is sufficient. The transaction fee is dynamic and will depend on the load of the network. The transaction fee can be measured in satoshis (or whatever coin/token the blockchain system uses) per byte (where a satoshi is one hundred millionth of a single Bitcoin). Therefore, if the payload is large, the fee will also need to be large, and the funding input(s) will be adjusted accordingly. As a result of the UTXO model, the total fee(s) paid are controlled by the values of both the UTXO referenced in the input and the UTXO on the output. The change leftover from covering the transaction fee is optionally sent back to the same computing device managing, creating, and submitting these transactions to the blockchain. The funding inputs and change resulting from said funding inputs operates as a float and managed by said funding service.

The initial 660 and final 662 transactions also comprise stream metadata 664, 666. The initial stream metadata comprises the seed as described with reference to FIG. 6B among other values relevant to the maintenance of the chain(s) of dust. The metadata 666 of the final transaction 662 comprises information to signify that this transaction is the last in the chain. Preferably, the metadata 666 of the final transactions also comprises the transaction id 648*c* of the first transaction 660.

Both data append transactions 640*a*, 640*b* comprise payloads 642*a*, 642*b* respectively as described above. The payload 642*b* of the second transaction 640*b* comprises a reference to the payload 642*a* of the preceding transaction 642*a*.

In the chain 600 of blockchain transactions in FIGS. 5, 6A, 6B, 6C, and 6D, there is no explicit need for a transaction to reference the next transaction in the sequence. This is because the spending relationships in the transaction graph will always be sufficient to trace the sequence from one transaction forwards to the next.

Alternatively, the transactions do comprise a forward reference to the next in the sequence. Optionally, this is conducted by requiring the next data item and/or parts of the append transaction in the sequence to be known at the time of creating the current append transaction. For example, if a first transaction $Tx_1$ needs to reference the next transaction in the sequence $Tx_2$, then a typical mechanism would be to include the hash $H(Tx_2)$ within $Tx_1$. This would require knowledge of the full data of $Tx_2$ at the time of creating $Tx_1$, which may not always be possible.

Figure 6D:
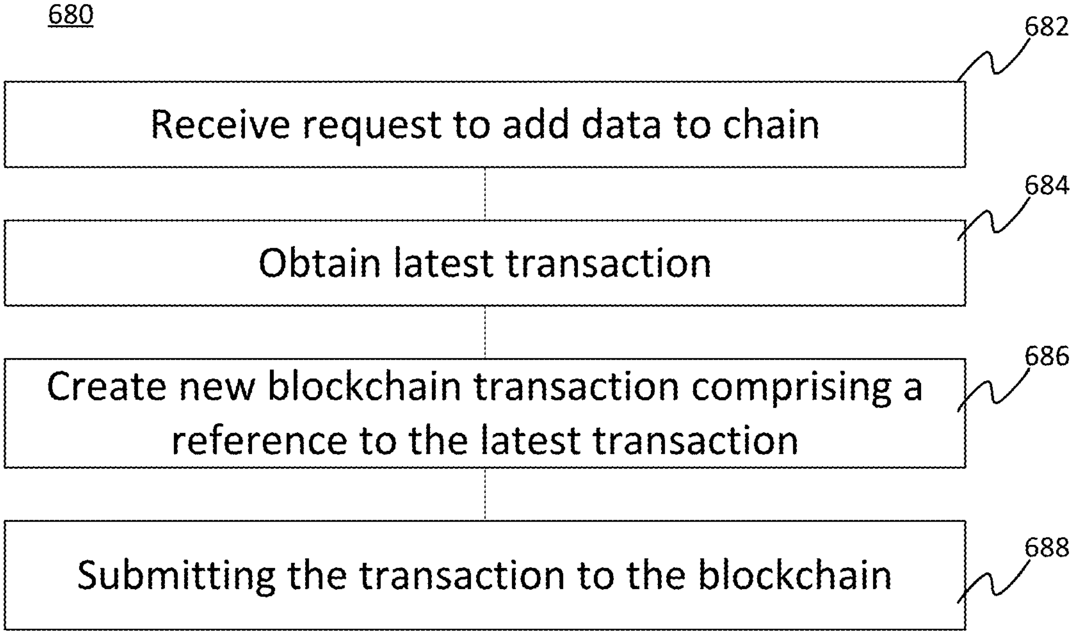
FIG. 6D is a flow diagram depicting a method for implementing an ordered append-only data storage system according to the first aspect.

Referring to FIG. 6D, a method 680 of adding an append transaction to a set of transactions is shown.

The data item for storing onto the blockchain is first received 682. The data may be received as part of a request which contains further metadata such as which chain it relates to. Alternatively, the application is already aware of the relevant chain from previous requests and/or configuration. The data item may be data for storage in the event data representation section. Alternatively, the data item is a hash of data, and the data item is stored in the dataDigest, section of the transaction.

The latest transaction in the set of transactions is obtained 684. Optionally, the latest transaction is obtained by recalling it from a memory.

A new transaction is created 686. The new transaction comprises at least an input that is associated with the output from the latest transaction, a dust output, the data item, and a reference to the latest transaction. Preferably, it is the dust output from the latest transaction. Preferably the reference to the latest transaction comprises a hash of a section of the latest transaction. More preferably, the reference is a hash of the preimage of the latest transaction.

The new transaction is then submitted 688 to the blockchain.

Ancestor Limits

In many implementations of the Bitcoin protocol, there exists a concept known as the ancestor limit. The ancestor limit places a maximum on the largest chain of unconfirmed transactions with successive spending dependency that can be processed in a single inter-block interval. At the time of writing, the limit is set to 25 unconfirmed ancestors on Bitcoin and 1000 on Bitcoin SV (previously 50 and 25 before that). It will be understood that aspects and embodiments of the present disclosure are not limited to this value.

Any applications trying to create chains of spending-dependent transactions at high frequency will suffer from the existence of the ancestor limit. The ordered, append-only data storage system described herein is one such example, as a stream which needs to log more than 25 events in a single inter-block period will be limited by this issue because all the transactions in the stream are spending-dependent by design.

In some examples, every 10 minutes or so (on average) a new Bitcoin block is produced. Thus, an ordered, append-only data storage system according to the embodiment described with reference to FIGS. 5, 6A, 6B, and 6C operating on the Bitcoin network can store, for example, 25 data items every 10 minutes before encountering the ancestor limit.

Overcoming the Ancestor Limit

In the first aspect of the invention as described with reference to FIGS. 5, 6A, 6B, and 6C, the chain of dust protocol ensures that each data payload is included in an on-chain transaction in a sequence of linked transactions. The transactions are then linked to one another sequentially by spending a dust output from one transaction to the next, creating an on-chain transaction spending graph.

Accounting for the ancestor limit however, either data is not added to the blockchain more frequently than the ancestor limit every block creation period (thus putting limitations on the data writer and/or system wanting to store data on the blockchain), or a break in the transaction spending graph must be introduced while still allowing the full set of transactions in the chain or chains to be traversed efficiently.

A challenge is to ensure that the sequence of data elements/payloads can be traversed in sequence using the transaction frames despite the ancestor limit introducing a break in the transaction spending graph.

FIGS. 7A, 7B, 8, and 9 relate to a second aspect of the present disclosure and describe data structures 700, 714, 716, a method 800 for adding a data item to a chain of dust and conditionally creating a new chain of dust, and a method 900 for traversing forwards through the chain of dust. The present aspect described here may optionally be used in addition to the aspect described with reference to FIGS. 5 and 6A, 6B, and 6C. The present aspect may be used with other blockchain systems to construct sequences of transactions with a spending relationship and overcome the ancestor limit.

Figure 7A:
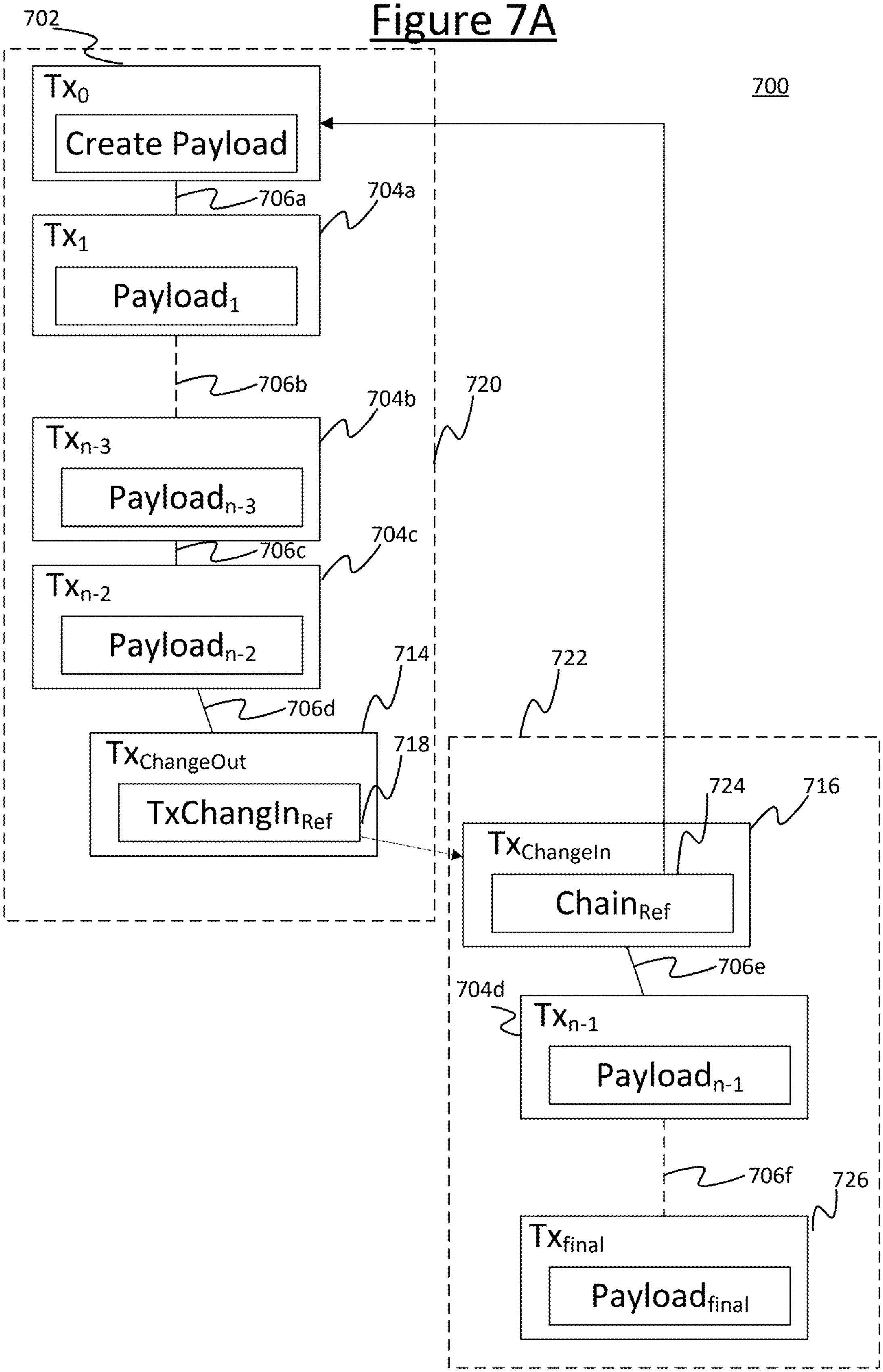
FIGS. 7A and 7B are schematic diagrams depicting the data structures according to a second aspect.

Referring to FIG. 7A, an overview of the chain of dust data structure 700 used in the second aspect is shown. A set of transactions is shown that comprises two subsets of transactions, the subsets being chains of dusts 720, 722. Each chain of dust comprising a number of append transactions 704*a-d*. The first chain of dust 720 is terminated by a change-out transaction 714 and the second chain of dust 722 starts with a change-in transaction 716. There is no spending relationship between the change-in transaction 716 and the change-out transaction 714 thereby overcoming the ancestor limit problem. This can be described as a "hopping" to a new chain of dust.

The chain hopping is conducted when the number of transactions in a subset approaches the ancestor limit. Preferably, when the total number of transactions in the current chain is one less than the ancestor limit, a new chain must be used. Thus, the pair of change-out 714 and change-in 716 transactions are inserted between the $Tx_{n-2}$ 704*c* and $Tx_{n-1}$ 704*d* transactions where n is the ancestor limit. This is to account for the first transaction 702, 716 in a new chain (whether that be the initial transaction 702 or the change-in transaction 716) and to leave space for the change-out transaction 714 to also be included in the chain of dust.

Alternatively, the chain hopping is conducted when the number of unconfirmed transactions in the chain approaches the ancestor limit. This way, the subset of transactions relevant to chain hopping is defined by whether each transaction has been confirmed.

The subset of transactions is not a strict subset such that if there is only one chain of dust, then the membership of the subset is the same as the set of transactions.

The change-in transaction 716 also comprises a chain reference 724 to a preceding chain. In particular, the chain reference 724 refers to a chain by referring to a transaction in a preceding chain. Preferably, the chain reference 724 is to the first transaction 702 in the first chain 720. The first transaction 702 in the first chain 720 can also be called the initial transaction or $Tx_0$. Alternatively, the chain reference 724 is to the first transaction in the preceding chain—i.e. the change-in transaction of the preceding chain (this is not shown in FIG. 7 because the preceding chain is also the first chain).

Each append transaction 704*a-d* comprises a reference 706*a-f* to the preceding transaction in the chain of dust. This reference 706*a-f* comprises at least the spending relationship 606 as described with reference to FIGS. 5, 6A and 6B. Optionally, the transactions 604*a-d* further comprise the third backward reference (also described as the streamDigest$_{n-1}$ reference) 610, 612*a-c* as described with reference to FIG. 6A.

The change-out transaction 714 comprises a forward reference 718 to change-in transaction 716. In the present example, this reference 718 is to the transaction id of the change-in transaction 716. Because the reference 718 is or comprises a hash of the transaction 716, the change-in transaction 716 must be created first. This does not necessitate that the change-in transaction 716 is published or submitted to the blockchain first.

This forward reference 718 allows a party wanting to extract information stored in the present data storage system to traverse the chains forwards.

While FIG. 7A only shows two chains of dust 720, 722, a person skilled in the art will appreciate that chains can be added onto one another using the same techniques described herein.

Figure 7B:
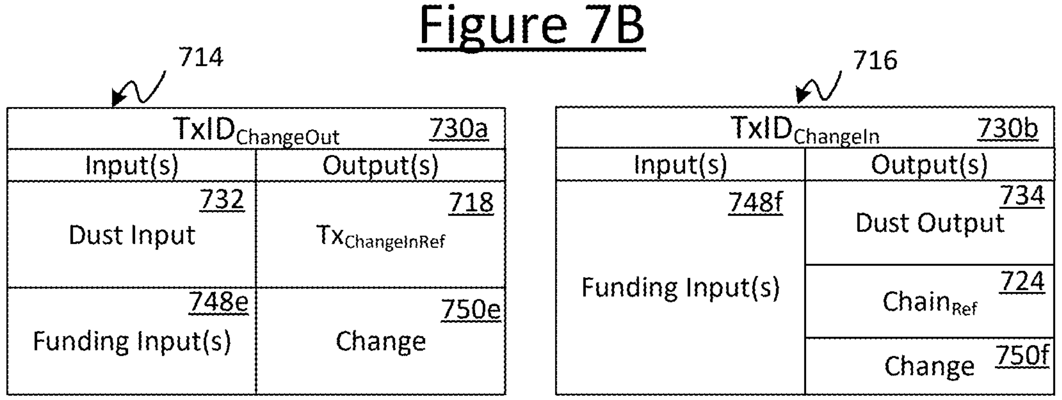

Referring to FIG. 7B, example blockchain transaction formats for the change-out 714 and change-in 716 transactions are shown. These transactions have many of the same or similar features as the transactions 604*a-d* described with reference to FIGS. 6B and 6C. The same or similar names have been used where the features are the same or similar.

The dust input 732 of the change-out transaction 714 comprises a reference to a dust output of the last append transaction in the preceding chain of dust. The change-out transaction 714 comprises, as part of its outputs, a reference to the change-in transaction 716. In particular, the change-out transaction 714 comprises the transaction id 730*b* of the change-in transaction 716.

The append transactions 704*a-d* of the present aspect have a very similar format as those the append transactions 640*a*, 640*b* described with reference to FIG. 6B except that the dust inputs 646*a*, 646*b* won't always refer to the previous append transaction's dust output 644*a*, 644*b*. When the change-out 714 and change-in 716 transactions are used as described in reference to FIG. 8, then the next append transaction 704*d* will follow on from the change-in transaction. That is, the dust inputs of the form 646*a*/646*b* of the next append transaction 704*d* will spend the dust output 734 of the change-in transaction.

Figure 8:
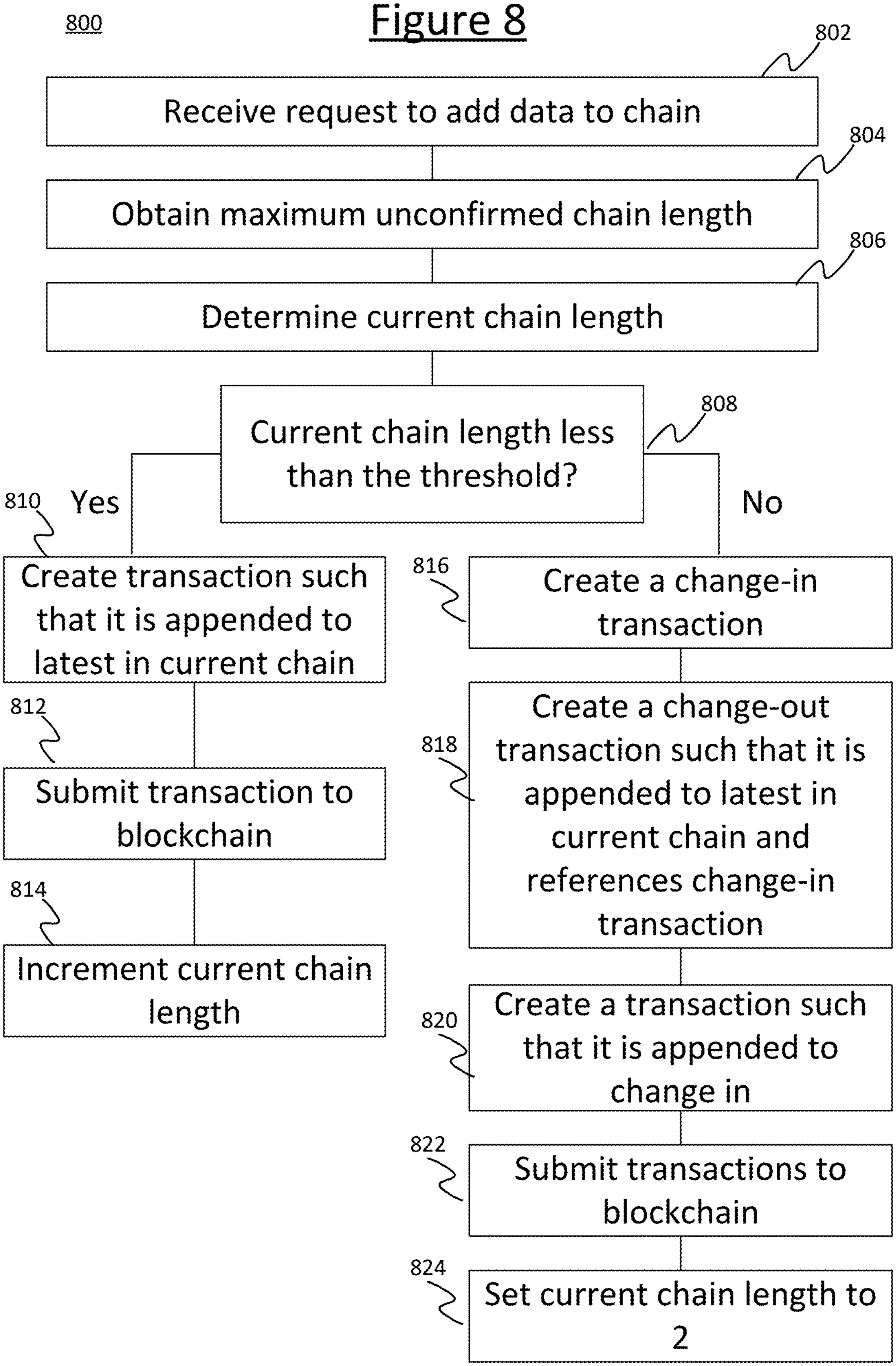
FIG. 8 is a flow diagram depicting a method for implementing an ordered append-only data storage system according to the second aspect.

Referring to FIG. 8, a computer implemented method 800 for adding a data item to a chain of dust and conditionally creating a new chain of dust according to the structure 700 as described with reference to FIG. 7. While these steps are discussed and shown as sequential steps, many of them may be conducted in any order, in parallel, or concurrently. For example, the first three steps 802, 804, and 806 may be in any order.

The data for storing onto the blockchain is first received 802. The data may be received as part of a request which contains further metadata such as which chain it relates to. Alternatively, the application is already aware of the relevant chain from previous requests and/or configuration.

Next, the maximum unconfirmed chain length is obtained 804. This value may be pre-configured, accessed via a variable stored in a memory, recalled from a storage, or obtained from a third party. This maximum unconfirmed chain length is the ancestor limit as discussed above. Preferably, this step is conducted once for as long as the ancestor limit doesn't change and not conducted every time a request to store data is received.

The transaction id of the latest transaction in the current chain is obtained. The transaction id is used to associate an input to the next transaction in the chain with an output of the latest transaction. Preferably, the transaction id is retained from when the latest transaction was submitted to the blockchain. Alternatively, the latest transaction is obtained, optionally by traversing through to the latest transaction in the chain. The transaction id is then determined by hashing the latest transaction.

The current chain length is then determined 806. Preferably this value is stored as a variable in a memory for quick recollection. Additionally, or alternatively, if the latest transaction in the current chain is known, the index of the transaction is read from the preimage data of the payload of said transactions. As a further alternative, the entire length of the chain is counted every time this step is run. Optionally, the current chain length is representative of the number of unconfirmed transactions in the current chain.

As an alternative to determining the current chain length, the number of transactions in the current chain that have not been included in a block on the blockchain is determined instead. The method 800 continues as normal by using this as the "current chain length".

As a further alternative to determining the current chain length, the number of transactions in the current chain that have not been "confirmed" on the blockchain is determined instead. The definition of "confirmed" depends on the blockchain in question. By way of example, many Bitcoin related applications consider that when a block has 6 blocks added after it, it is considered "confirmed".

An advantage of using the current chain length over the number of unconfirmed transactions in the current chain is that there is an inherent resilience to the blockchain forking and transactions that were part of a mined block and/or considered "confirmed" in the blockchain are no longer part of the blockchain. This is at the cost of potentially using the change-in and change-out transactions when not strictly necessary. These alternatives may be selected and switched between depending on the nature and frequency of data being submitted to the blockchain.

A determination 808 is made as to whether the current chain length is equal to or greater than a threshold number. Preferably, the threshold is chosen such that there is at least one unconfirmed transaction allowed left in the chain of unconfirmed transactions so that the change-in out transaction will still be allowed. Preferably, the threshold number is one less than the maximum unconfirmed chain length.

If the current chain length is less than the threshold, then the transaction is created 810 according to the transactions as described with reference to FIGS. 6A and 6B. That is, the newly created transaction comprises an input referring to an output of the latest transaction in the chain.

The transaction is submitted 812 to the blockchain so that other computing devices may mine it and add it to the blockchain.

Optionally, if the current chain length is being stored, the current chain length is incremented 814.

If the current chain length is at or over the threshold, then the change-out and change-in transactions are created.

The change-in transaction is created 816 first as discussed with reference to FIGS. 7A and 7B.

The change-out transaction is then created 818 as discussed with reference to FIGS. 7A and 7B. The change-out transaction comprises a forward reference to the change-in transaction. The forward reference comprises or is the transaction id of the change-in transaction.

A new transaction that comprises the data to be submitted to the blockchain is created 820. The new transaction comprises an input associated with an output of the change-in transaction. The new transaction also comprises the data to be submitted to the blockchain.

Optionally, if the current chain length is being stored, the current chain length is set to 2 as the current chain comprises the change-in transaction and an append transaction.

Optionally, the new transaction also comprises a reference to the latest transaction in the current chain. This reference is of the form of the third backward reference 610, 612*a-c* as described with reference to FIGS. 6A and 6B.

A person skilled in the art will appreciate that the steps 816, 818, 820, 822, 824 relating to creating the change-out and change-in transaction, including checking 808 whether the current chain length is less than the threshold may also be performed after the step of submitting 812 the append transaction and/or the step 814 of incrementing current chain length. This way, the new chain of dust is already established for the next append transaction.

Figure 9:
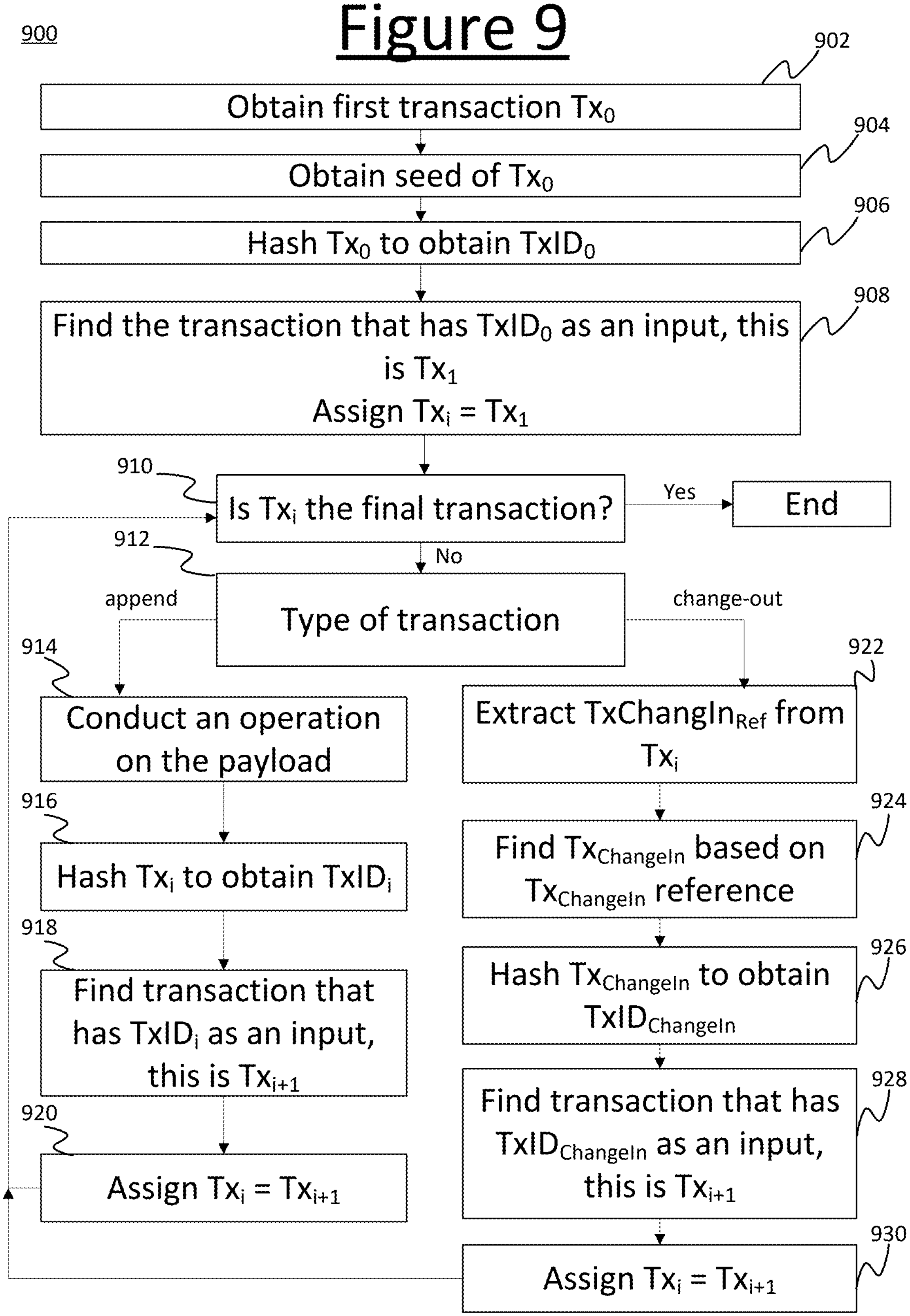
FIG. 9 is a flow diagram a method for traversing an ordered append-only data storage structure according to the second aspect.

Referring to FIG. 9, a method 900 for traversing forward through the chain(s) of dust with the structure as described with reference to FIGS. 7A, 7B, and 7C, and created with the method as described with reference to FIG. 8. Forward traversal means moving in the direction of increasing sequence or index number. This can also be viewed as moving from older to newer data items. The use of the backwards references in the append transactions and the forward reference in the change-out transaction to the change-in transaction enables this forward traversal.

Advantageously, the method 900 of traversal requires no hidden knowledge to traverse the transactions beyond the format of the transactions on the blockchain. The references used in traversal are all published with the data items on the blockchain. Therefore, third parties are also able to traverse the chain(s) of dust and obtain, store, verify, and/or otherwise use the data items stored on the blockchain without any private or proprietary services. Notably, because of the nature of blockchain and the present data writing system and methods, any operations conducted on the data stored on the blockchain are read-only. It is not practical to modify the data stored on the blockchain.

The first transaction is obtained 902. This is the transaction to traverse forward from.

Optionally, the seed (if it is the first transaction in the chain(s) of dust), or the stream digest (if it is an append transaction) is obtained and stored 904 for verification later.

Next, the first transaction is hashed 906 to obtain its transaction id.

Using the transaction id of the first transaction, we locate 908 a transaction in the chain of dust that references this transaction id in its input. This is the next transaction in the chain of dust. The next transaction is assigned as the current transaction for the next step 910.

The step of locating 908 a transaction optionally involves iterating through all of the blocks in the blockchain (starting from the block the current transaction is in, as it won't be located in a preceding block given we are traversing forward—the opposite is true if traversing backwards) to locate it.

Alternatively, or additionally, the step of locating transaction comprises consulting an off-chain log or database that replicates the chain of dust or stores metadata associated with each transaction in the chain of dust.

In some embodiments, the off-chain log or database associates each transaction that is part of the chain(s) of dust with the block header or at least the block id the transaction is a part of. This way, using the transaction reference (optionally a transaction id, or in some aspects the PrevOut funding inputs), the block comprising the transaction of interest is obtained and then searched for the transaction. This embodiment shortcuts at least part of the locating step as compared with iterating over every block in the blockchain to locate the appropriate transaction.

A platform processor operating as part of the platform services as described with reference to FIGS. 15 and 16 optionally maintains this log or database.

In some embodiments, a channel service is present as described with reference to UK Patent Application No 2007597.4 (filed in the name of nChain Holdings Limited on 21 May 2020). This channel service provides notifications to third parties when a transaction is confirmed on the blockchain. The notifications comprise details such as block header of the block the transaction was confirmed in and transaction id. A third party subscribing to these notifications can use the information obtained notifications to locate the transaction on the blockchain in a similar method as above by going straight to the correct block.

A loop is then entered that operates on the current transaction (labelled as $Tx_i$ in FIG. 9). The first step in the loop checks 908 whether current transaction is the final transaction. If the current transaction is not the final transaction, the method continues to the next step 912. If it is the final transaction, the loop and the method 900 is terminated. Alternatively, if the final transaction comprises a reference to the first transaction, the method 900 can optionally wrap around the set of transactions and continue to traverse the chain(s) if required. This may be required if, for example, the method did not start at the first transaction of the chain(s) of dust and the user traversing the chain(s) would like to traverse through all of the transactions. In this case, the loop terminates when the transaction the traversal started on is reached again (i.e. the loop has looped back to the start and all of the transactions in the chain(s) have been traversed over).

The step of determining 910 whether a transaction is a final transaction is based on whether the transaction comprises metadata or not. Alternatively, the final transaction comprises a flag to signify it is the final transaction. A further alternative of determining whether the final transaction is a final transaction or not is based on whether the transaction comprises a dust output that is not spent, and the transaction does not comprise a reference to a change-in transaction (otherwise the transaction would likely be a change-out transaction).

Next, a determination 912 is made as to the type the current transaction is. Optionally, this is checked as a part of checking whether this is a final transaction or not. If the transaction comprises a payload it is considered an append transition. If the transaction does not comprise a payload, then it is considered a change-out transaction. Alternatively, if the transaction comprises a reference to the next change-in transaction, then it is a change-out transaction.

If the transaction is an append transaction, an optional operation is conducted 914 on the payload. The operation conducted optionally depends on a configuration provided by the traverser.

Preferably, the operation is to verify the previous transaction. The verification is based on the third backward reference 610, 612_a-c_ as described with reference to FIGS. 6A and 6B. The stream digest of the current payload is stored for verification in the next loop iteration. The stream digest of the previous transaction, which is stored in the current transaction's payload, is used compared with the previous stream digest or seed stored from the previous loop iteration or the optional step 904 which obtains and stores said value.

Additionally, or alternatively, the data item of the payload is stored for later use. Additionally, or alternatively, a callback, provided by the traverser, is called thereby allowing arbitrary operations to be conducted on the payloads by the traverser.

The current transaction is hashed 916 to obtain the transaction id of the current transaction.

The next transaction is located 918 by finding the transaction that has an input referencing the transaction id of the current transaction.

The loop repeats with the next transaction assigned 920 as the current transaction. The loop starts at the step of determining 910 whether the current transaction is the final transaction.

Returning to the step of determining 912 the type of transaction, if the current transaction is a change-out transaction, then the reference to the change-in transaction is obtained. The reference is preferably obtained by extracting 922 it from the change-out transaction where it is stored.

With the reference to the change-in transaction, the change-in transaction is found 924. In the present aspect, the change-in transaction is a transaction id of the change-in transaction. The change-in transaction may be found on the blockchain itself if it has been confirmed or found in the mempool of a blockchain network node if the transaction has not been confirmed yet.

The change-in transaction is hashed 926 to obtain the transaction id of the change-in transaction. The next transaction in the chain of dust will comprise a backward reference to the change-in transaction in the form of the change-in transaction id. In particular, the next transaction spends an output associated with the change-in transaction.

With the transaction id of the change-in transaction, the next transaction is obtained 928.

The loop repeats with the next transaction assigned 920 as the current transaction. The loop starts at the step of determining 910 whether the current transaction is the final transaction (which is also the point at which the loop can terminate, as described above).

The method 900 is described as starting from a first transaction in the set of transactions. However, a person skilled in the art would appreciate that this method 900 can also be used from any transaction as a starting point by starting at the start 910 of the loop.

The step 912 of determining the transaction type is preferably based on the contents of the current transaction. Preferably, the size of an output of the current transaction is used to determine whether it is an append transaction or change-in transaction. If the current transaction is a change-in transaction, then one of the outputs will comprise at least one transaction outpoint <PrevOut(s)>. Alternatively, the presence of a preimage, a streamDigest, and an event data representation section as described with reference to the first aspect is used to determine whether the transaction is an append transaction. Alternatively, the presence of the <PrevOut(s)> field as described herein is used to determine whether the transaction is a change-in (or change-out for the forward traversal). Alternatively, the number of fields in an output of the current transaction is used to determine the type of transaction as there are more fields in the append transaction payloads. Alternatively, the lack of a dust output in the current transaction is used to indicate that the current transaction is a change-out transaction. Alternatively, the number of outputs is used to determine the type of transaction as the change-out has one less output than the append transaction. Alternatively, templates of all of the possible structures the current transaction can take are used to pattern match with the current transaction to determine its type.

Transaction Malleability

The concept of transaction malleability relates to the phenomenon whereby the parts of a valid transaction (for example a Bitcoin transaction) can be modified without invalidating the transaction. Typically, transaction ids are used to reference transactions, where a transaction id is a hash of the entire transaction. Thus, a problem occurs when referencing transactions, as any modification to any part of the transaction will also alter the hash of the transaction, which may invalidate any references to said transaction.

In general, there are two broad types of malleability that are possible in blockchain transactions, both of which allow the content of a transaction to be modified without invalidating the signature provided in or over an input.

For this example, in both cases, it is assumed an initial transaction Tx has one input, one signature in that input, and one output.

Type 1: Script-Level Malleability

This type of malleability takes advantage of the fact that a Bitcoin signature, which is to be checked with the script opcode OP_CHECKSIG, does not sign the scriptSig field of any input in the transaction that contains the signature.

This fact allows us to generate a signature on a transaction Tx, modify the input script such that the transaction Tx' is non-identical to Tx, and still have both Tx and Tx' be considered valid transaction messages signed by the same signature under the blockchain consensus rules.

Type 2: Input and Output-Level Malleability

This type of malleability relies on the use of SIGHASH flags other than SIGHASH_ALL being employed in a transaction.

If a transaction Tx has an input signature that uses any of the five other SIGHASH flag combinations, then either an input(s) or output(s) can be added to create a non-identical transaction Tx', such that both will be considered valid transaction messages according to the consensus, without needing to alter the signature.

Thus, every transaction of the aspects described herein preferably use the SIGHASH_ALL flag to overcome this malleability.

Advantageously, the following third, fourth, fifth, and sixth aspects comprise data structures and associated methods that provide further and/or alternative techniques for ensuring invariance of references.

The term 'invariant reference' to a transaction means a reference to a valid transaction based on data in the transaction that cannot be modified (i.e. are invariant) once the transaction has been published to the Bitcoin network.

An 'immutable reference' to a transaction typically means the transaction ID of a confirmed transaction, which cannot be changed to within a high degree of certainty. An invariant reference can be an immutable reference.

If a part of a change-in transaction is modified between the inclusion of transaction id of the change-in transaction in the payload of the change-out transaction and the inclusion (also known as confirmation) of change-in transaction on the blockchain, then the transaction id of the change-in transaction will be different between the one stored on the change-out transaction and the change-in transaction stored on the blockchain, thereby breaking the reference that bridges the two dust chains.

In other words, it is possible that the change-out transaction's forward reference is to an incorrect change-in transaction id, when it should be pointing to a new transaction id based on the modified transaction id. If such a modification were to occur, this would defeat the purpose of including the reference entirely, as it would no longer point to the correct on-chain transaction to continue traversing the event stream.

The risk of such an attack occurring, whereby a malicious miner or eavesdropper managed to modify a transaction before it is propagated to a large proportion of the Bitcoin network, is non-zero. It is therefore desirable to find a robust solution to this problem.

Malleability of the append transactions does not occur because of the non-malleable spending reference as discussed above under the "Transaction Malleability" heading. The change-out and change-in transactions cannot have such a spending link (otherwise they could not be used to overcome the ancestor limit).

Confirming the Change-In Transaction on the Blockchain

Figure 10:
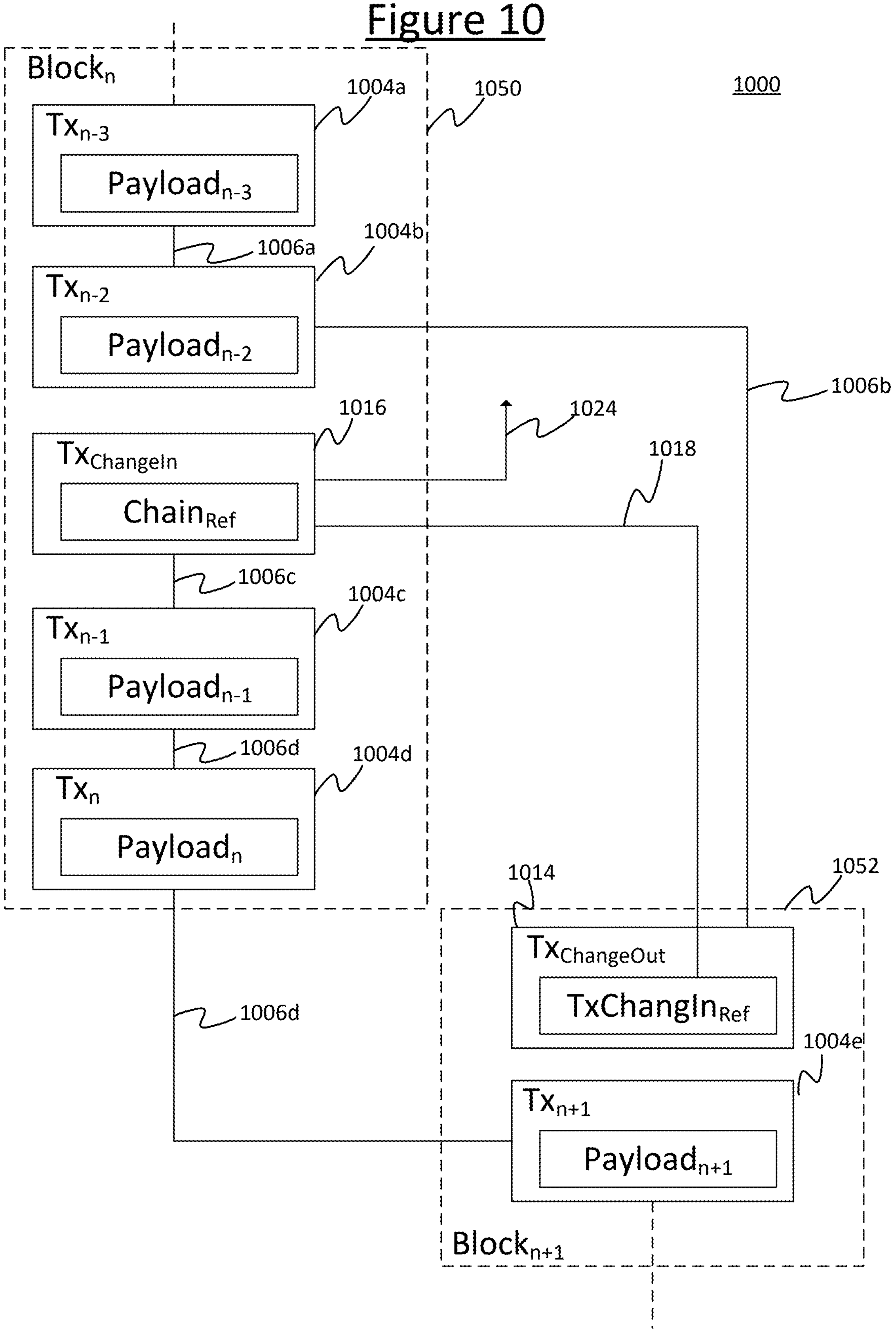
FIG. 10 is a schematic diagram depicting data structures for ordered, append-only data storage according to a third aspect.

Referring to FIG. 10, a data structure 1000 according to a third aspect for creating an immutable change-in transaction 1016 and an invariant and immutable reference 1018 to the change-in transaction 1014 is shown. With an immutable change-in transaction, an immutable reference to the change-in transaction can be created thereby overcoming the change-in transaction malleability issues as discussed under the heading "Transaction Malleability" above.

FIG. 10 presents the data structure differently to preceding figures in that it is shown chronologically (the transactions submitted earlier appear higher on the page) and describes which blocks in the blockchain comprise which transactions. Which blocks 1050, 1052 comprise which transactions is of relevance to this aspect.

FIG. 10 comprises similar numeral references and names for the features that are similar to those in the second aspect. For example, each append transaction 1004*a-d* and final transaction 1026 comprises a backwards spending reference 1006*a-f* to its preceding transaction. This is similar to the append transactions 704*a-d* and final transaction 726 as shown in FIG. 7A which also comprise a backwards spending reference 706*a* to its preceding transaction.

The present aspect optionally includes the second 608 and third backward 610, 612*a-c* reference features of first aspect.

In the present aspect, the change-in transaction 1016 is confirmed in a block 1050 on the blockchain before the change-out transaction 1014 references it. Once the change-in transaction has been confirmed on the blockchain, it is practically impossible for a malicious miner to change the transaction and therefore change the transaction id. The reference 1018 is therefore immutable in that the reference is valid and always will be valid. No changing of the reference or the transaction is possible.

An output of the change-in transaction can still be spent such that the next append transaction 1004*c* can reference the change-in transaction 1016 without needing to wait for it to be confirmed in a block. Thus, the append transactions can still be submitted without waiting for the change-in to be confirmed. The resulting data structure 1000 at the chain(s) of dust level of abstraction will look and operate in the same way as described with reference to FIGS. 7A, 7B, and 9.

The method for adding a data item to a chain of dust and conditionally creating a new chain of dust as described in the second aspect operates substantially the same in this aspect except for that step 818 of creating and submitting the change-out transaction 1014 is delayed until the change-in transaction has been included in a block on the blockchain. This step 818 can be run asynchronously to the remainder of the method as no other transactions in this aspect reference the change-out transaction 1014. Once the change-in transaction 1016 has been submitted to the blockchain its outputs can be spent, and the method continues as normal.

The change-in transaction comprises a chain reference 1024 to a preceding chain similar to the chain reference 724 as described in the second aspect with reference to FIG. 7A.

The method of traversal of the data structure 1000 is substantially the same as described with reference to FIG. 9 in the second aspect.

Non-Malleable Forward Change-In Referencing

Figure 11:
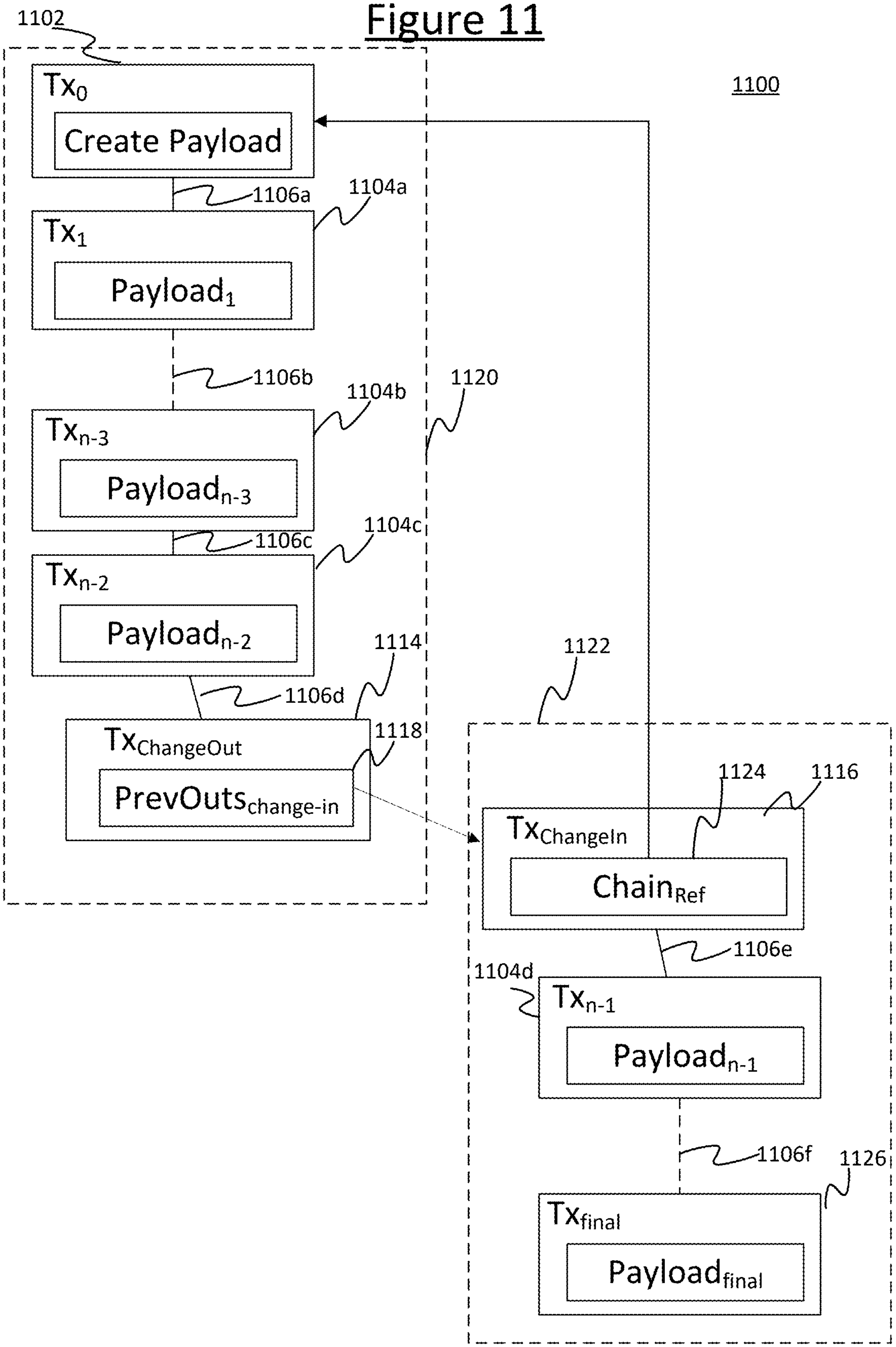
FIG. 11 is a schematic diagram depicting data structures for ordered, append-only data storage according to a fourth aspect.

Referring to FIG. 11, a data structure 1100 according to a fourth aspect for creating an invariable reference 1118 to the change-in transaction 1116 is shown.

While the fourth aspect does comprise a forward reference 1118 from the change-out transaction 1114 to the change-in transaction 1116 similar to that of the second and third aspects, instead of forward reference 718 being the transaction id of the change-in transaction 1116, the reference comprises at least one of the input(s) of the change-in transaction 1116. Preferably, the reference to the at least one of the inputs(s) is in the form of the transaction outpoint(s) where the transaction outpoint comprises the transaction id comprising the output and the index of said output. Preferably, the reference 1118 comprises the set of previous transaction output(s) consumed by the change-in transaction 1116. The set of previous transaction outputs is called $\text{PrevOuts}_{change\text{-}in}$. An example format for $\text{PrevOuts}_{change\text{-}in}$ is:

$$PrevOuts_{change\text{-}in} = \{PrevOut_1: TxID_{Prev,1},\ vout_1),\ PrevOut_2: (TxID_{Prev,2},\ vout_2)\}.$$

Where $\text{TxID}_{Prev,n}$ is the transaction id of the transaction comprising the output being spent and $\text{vout}_n$ is the index of said output in said transaction. The tuple ($\text{TxID}_{prev,n}$, $\text{vout}_n$) is the transaction outpoint. Each PrevOut in the set of PrevOuts for a transaction is in and of itself unique as each is a transaction output on the blockchain and these are unique. Therefore, the PrevOuts set is also unique.

Preferably, the forward reference is stored in the script section of an output of the change-out transaction in the form: OP_FALSE OP_RETURN 0x20<$\text{TxID}_{Prev1}$><index length><$\text{vout}_1$>

If more than one funding input is used to fund the change-in transaction, then further inputs are appended to the format above as such:

<$\text{TxID}_{Prevn}$><index length><$\text{vout}_n$>

More preferably, the script comprises 0x20<txidcreate > after the OP_RETURN and before the PrevOut(s) references.

Therefore, the reference 1118 to the change-in transaction is not based on the transaction id or any other malleable section or aspect of the change-in transaction 1116. This way, even with a malicious miner modifying the transactions, the reference 1118 will still be valid thereby overcoming the change-in transaction malleability issues as discussed under the heading "Change-in Transaction Malleability" above.

If the transaction is finalised (i.e. valid, and all of its signatures use appropriate flags to that no new inputs/outputs can be added), which we can assume is the case in the transactions of any of the aspects described herein (any input signatures should use the SIGHASH_ALL flag as discussed above), then the only parts of the transaction that can be modified are the unlocking script fields. The locking scripts in the outputs can't be changed because the inputs should contain signatures signing over them. Any change in the outputs would invalidate these signatures. As long as the $\text{PrevOuts}_{change\text{-}in}$ reference 1118 appears in an output of the change-out transaction 1114 then the reference 1118 cannot be modified because it is located in output scripts. Even if the input scripts of the transactions are modified by somebody, the PrevOut reference will not change and will lead to the correct transaction when traversing the chain of dust.

FIG. 11 comprises similar numeral references and names for the features that are similar to those in the second and/or third aspects. For example, each append transaction 1104*ba-d* and final transaction 1126 comprises a backwards spending reference 1106*a-f* to its preceding transaction. This is similar to the append transactions 704*a-d* and final transaction 726 as shown in FIG. 7A which also comprise a backwards spending reference 706*a-f* to its preceding transaction.

The method of traversing forwards through the data structure 1100 as described in the present aspect is substantially the same as the method 900 described with reference to FIG. 9 in the second aspect except for the differences outlined below. In the present aspect, the reference extracted in step 922 is the $\text{PrevOuts}_{change\text{-}in}$ reference 1118 instead of the transaction id of the change-in transaction. The change-in transaction 1116 is located based on this reference 1118. The change-in transaction 1116 is found by looking for the transaction comprises at least a subset of the $\text{PrevOuts}_{change\text{-}in}$ output(s) as input(s). The change-in transaction 1116 is then hashed to obtain its transaction id and the method 900 continues as normal from finding 928 the next append transaction based on the change-in transaction id.

The present aspect optionally waits to confirm the change-in transaction 1116 for additional security. The present aspect optionally includes the second 608 and/or third backward 610, 612*a-c* reference features of first aspect.

The method for adding a data item to a chain of dust and conditionally creating a new chain of dust as described in the second aspect operates substantially the same in this aspect except different references are used.

Optionally, the invariant forward reference 1118 is used in addition to the forward references 718, 1018 as described in aspects two and three.

While the complete set of inputs of the change-in transaction has been used in this aspect, it will be appreciated that a subset of the PrevOuts may also be used. For example, if the change-in transaction comprises two inputs as such:

$$PrevOuts_{change\text{-}in} = \{PrevOut_1 : TxID_{Prev,1}, vout_1),\quad PrevOut_2 : (TxID_{Prev,2}, vout_2)\}.$$

the reference to the change-in transaction is based on only one of the two. This is still a unique reference to the change-in transaction because, once this transaction has been published to the Bitcoin network, the first-seen rule and the fact that outpoints can only ever be consumed once on-chain ensure that this outpoint can never be consumed by an alternative transaction. Note that 'alternative' here refers to the structure of the transaction, i.e. its inputs, outputs, and value exchange, and does prohibit the transaction from being subject to non-functional changes through malleability.

Irrespective of whether any such malleability occurs, the final form of the transaction can always be uniquely identified by checking which transaction consumed this outpoint.

Using only one reference may be preferable in that only a single output is required to create a unique input-based (or PrevOut-based) reference because it will significantly reduce the overall size of the reference. This, in turn, reduces the cost in transaction fees of including the reference in an on-chain transaction. The minimum size of a prevOut-based reference in Bitcoin can be as small as 36 bytes (32-byte TxID, and 4-byte vout), and the size of the reference also therefore scales O(1) with the number of inputs of the referenced transaction.

Thus, the PrevOut references may comprise at least one of the at least one inputs to the change-in transaction. And preferably the PrevOut reference comprises just one of the at least one input to the change-in transaction.

Backward Referencing to Change-Out

Two-way references allow a pair of transactions to signal its relationship with the other. Further, this allows the link between the two to be identified independently of the transaction taken as the starting point i.e. allowing forward and backward traversal in the case of a linear sequence of events or data items.

However, in practice, achieving such two-way references is difficult due to the fact that, in general, each reference should exhibit the uniqueness. Achieving the property of uniqueness can be difficult because of circular referencing. The use of hash functions is a common way to assign a unique identifier to data. However, it is not possible to create two-way hash-based references between two blockchain transactions, because this creates a circular reference.

Figure 12:
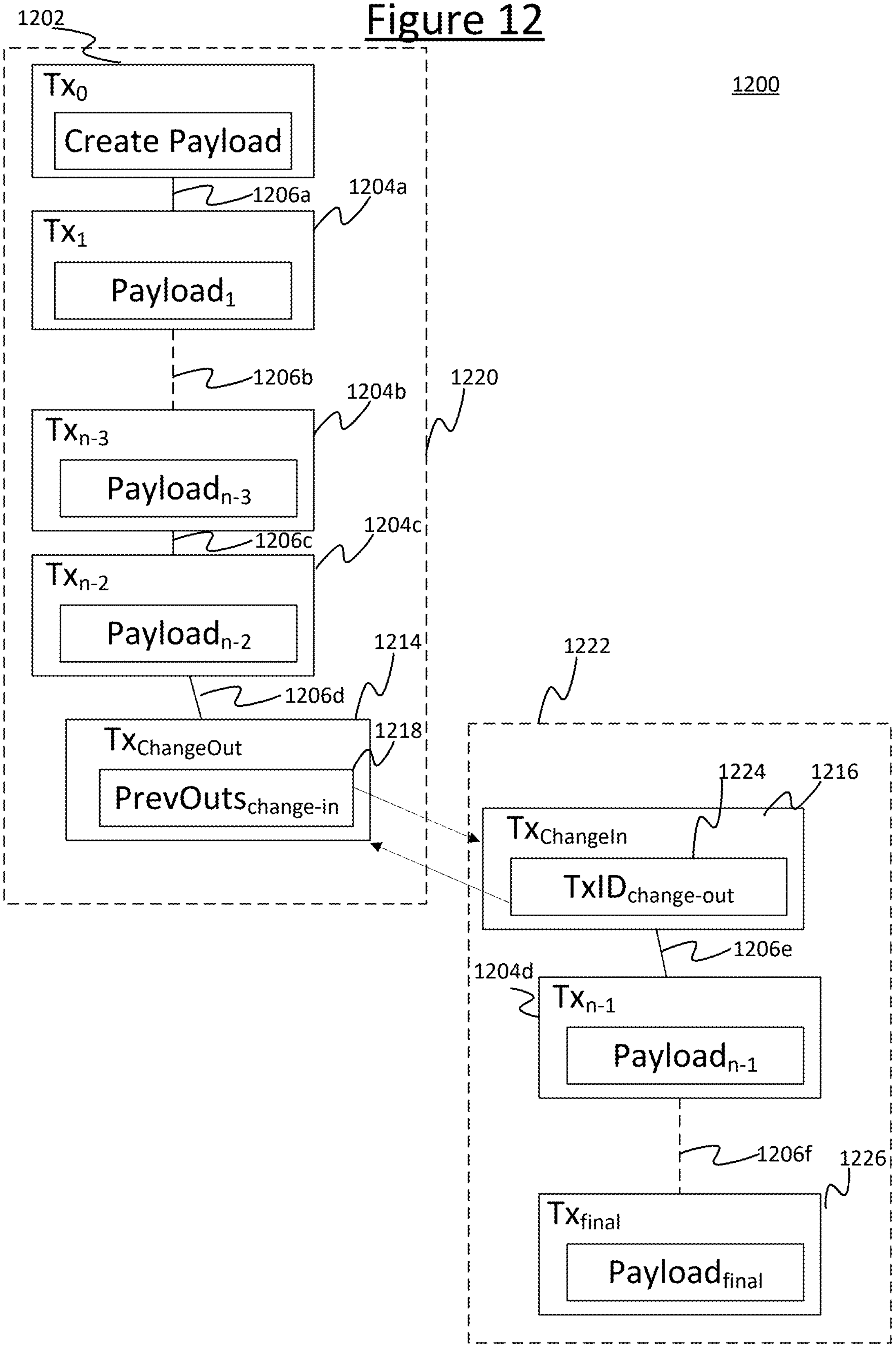
FIG. 12 is a schematic diagram depicting data structures for ordered, append-only data storage according to a fifth aspect.
Figure 13:
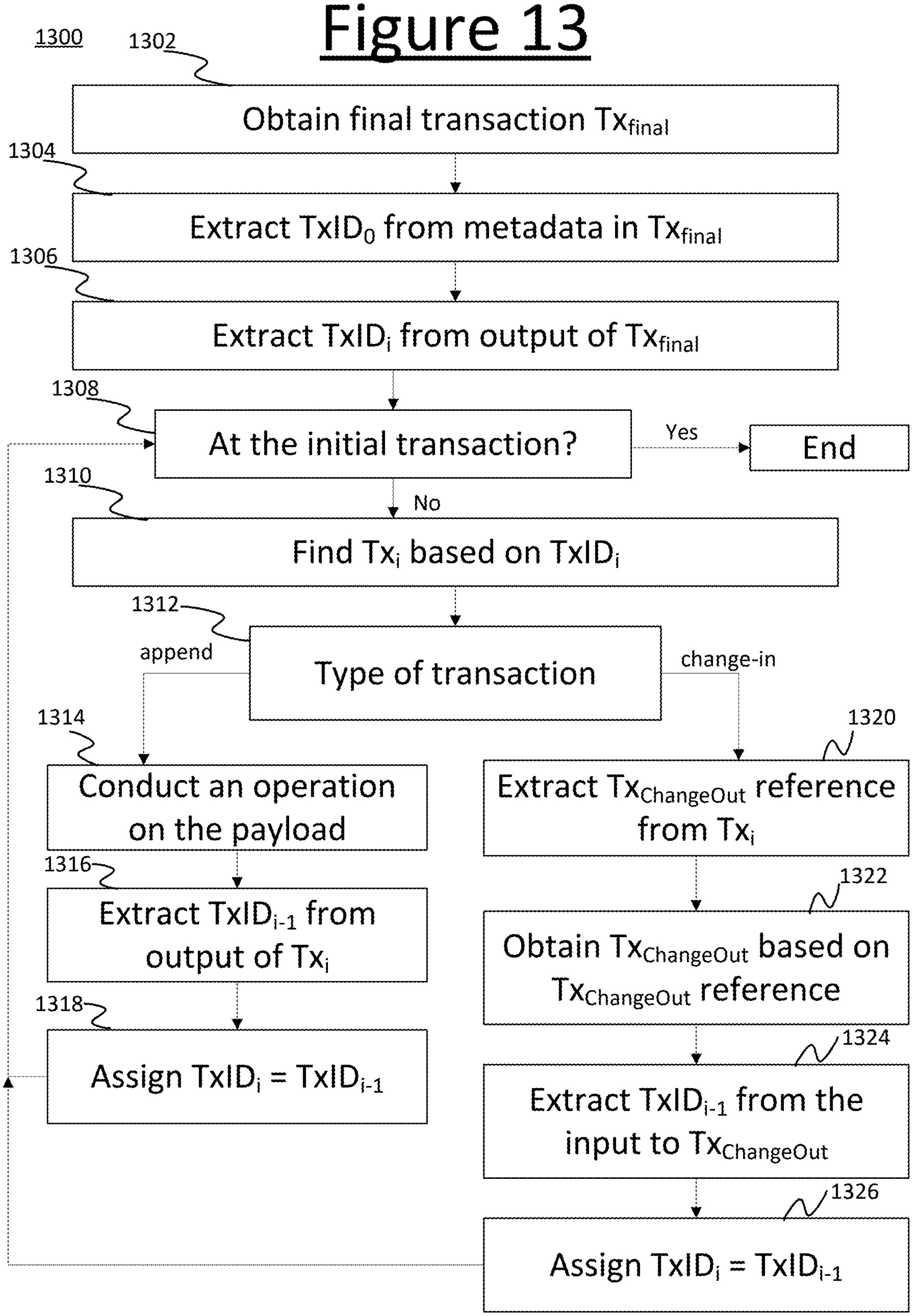
FIG. 13 is a flow diagram a method for traversing an ordered append-only data storage structure according to the fifth aspect.

Referring to FIGS. 12 and 13, a data structure 1200 and a method 1300 of traversing the data structure, according to a fifth aspect are shown. The data structure 1200 comprises invariant forward reference 1218 from the change-out transaction 1214 to the change-in transaction 1216 and a backward reference 1224 from the change-in transaction 1216 to the change-out transaction 1214.

FIG. 12 comprises similar numeral references and names for the features that are similar to those in the second, third, and/or fourth aspects. For example, each append transaction 1204*ba-d* and final transaction 1226 comprises a backwards spending reference 1206*a-f* to its preceding transaction. This is similar to the append transactions 704*a-d* and final transaction 726 as shown in FIG. 7A which also comprise a backwards spending reference 706*a-f* to its preceding transaction. The invariant forward reference 1218 is constructed and functions the same or similarly as the invariant forward reference 1118 as described with reference to FIG. 11.

The backward reference 1224 comprises the transaction id of the change-out transaction 1224. This is possible because the forward reference 1218 is no longer dependent on the transaction id of the change-in transaction 1216 thereby sidestepping the problem of circular hash references as described above.

With a backward reference 1224, traversal backward through the chain(s) of dust across any change-out/change-in transaction(s) is possible. The computer implemented method 1300 of traversal, shown in FIG. 13, starts at the final transaction 1226 in the chain(s) of dust. A person skilled in the art will appreciate that the method can optionally start at any position on the chain(s) of dust by starting at the step 1308 at the start of the loop.

As with the method 900 of backward traversal, advantageously, this method 1300 of traversal requires no hidden knowledge to traverse the transactions beyond the format of the transactions on the blockchain. The references used in traversal are all published with the data items on the blockchain. Therefore, third parties are also able to traverse the chain(s) of dust and obtain, store, verify, and/or otherwise use the data items stored on the blockchain without any private or proprietary services. Notably, because of the nature of blockchain and the present data writing system and methods, any operations conducted on the data stored on the blockchain are read-only. It is not practical to modify the data stored on the blockchain.

The first step 1302 is to obtain the final transaction, from here the method traverses backwards through the chain(s) of dust.

Optionally, the transaction id of the first transaction in the chain(s) of dust is stored in the final transaction. The transaction id of the initial transaction is stored for later reference.

The transaction id of the final transaction is extracted 1306 by hashing the final transaction. Said transaction id is assigned as the current transaction id. The method then enters a loop operating on the current transaction.

The first step in the loop is to determine 1308 whether the current transaction id refers to the initial transaction. Optionally, this is done by comparing the transaction id of the current transaction to that of the initial transaction id, which was stored in the second step 1304. Alternatively, this determination 1308 is conducted after the transaction is obtained 1310. The determination 1308 is then based on data and/or metadata stored in the transaction. For example, it may be possible to determine that a transaction is the initial transaction if it comprises a seed in its metadata as describe in the second aspect with reference to FIG. 6C.

If the current transaction is the initial transaction, the loop is terminated. Optionally, the loop is terminated at another transaction based on a supplied transaction id.

The current transaction is obtained 1310 based on the current transaction id (unless the transaction was already obtained as a part of determining whether the current transaction was the initial transaction).

If the current transaction is an append transaction, as determined 1312 based on the presence of a payload as described in the first aspect, then an operation 1314 is optionally conducted on the payload of the transaction.

Preferably, the operation is to verify the current transaction. The verification is based on the third backward reference 610, 612*a-c* as described with reference to FIGS. 6A and 6B. The stream digest of the current payload is stored for verification in the next loop iteration along with the stream digest for the next payload in the loop. If there is already a stream digest stored from the previous iteration in the loop, then the stream digest of the current transaction is compared with said stored previous stream digest to verify that the stream digests are correct.

Additionally, or alternatively, the data item of the payload is stored for later use. Additionally, or alternatively, a callback, provided by the traverser, is called thereby allowing arbitrary operations to be conducted on the payloads by the traverser.

The transaction id of the next transaction in the chain is extracted 1316 from the current transaction. The transaction id of the next transaction in the chain is stored as an input to the current transaction.

The next transaction id is stored 1318 as the current transaction id and the loop restarts at the start 1318 of the loop.

Returning to the determining 1312 the type of transaction step, if the transaction is a change-in transaction, then the reference to the change-out transaction is obtained. The reference is preferably obtained by extracting 1320 it from the change-in transaction where it is stored. In the present aspect, the reference to the change-out transaction is the transaction id of the change-out transaction.

The change-out transaction is then obtained 1322 using its transaction id.

The transaction id of the next transaction in the chain is extracted 1324 from the current transaction. The transaction id of the next transaction in the chain is stored as an input to the change-out transaction.

The next transaction id is stored 1326 as the current transaction id and the loop restarts at the start 1318 of the loop.

The method for adding a data item to a chain of dust and conditionally creating a new chain of dust of the present aspect operates in substantially the same way as in the second aspect except different references between change-in and change-out are used.

The method for traversing forwards through the data structure 1200 of the present aspect operates in substantially the same way as in the fourth aspect as it comprises the same forward references from change-out to change-in.

A person skilled in the art will appreciate that the references may be used vice-versa such that the change-out transactions comprises the transaction id of the change-in transaction and the change-in transaction comprises a reference to the inputs of the change-out transaction.

The step 1312 of determining the transaction type (whether it be append or a change-in) is conducted the same or similarly as described with reference to the forward traversal method except that a change-in transaction is determined instead of a change-out transaction (as the backward traversal encounters a change-in traversal first). Alternatively, the lack of a dust input in the current transaction is used to indicate that the current transaction is a change-in transaction. Alternatively, the number of inputs is used to determine the type of transaction as the change-in has one less output than the append transaction.

Figure 14:
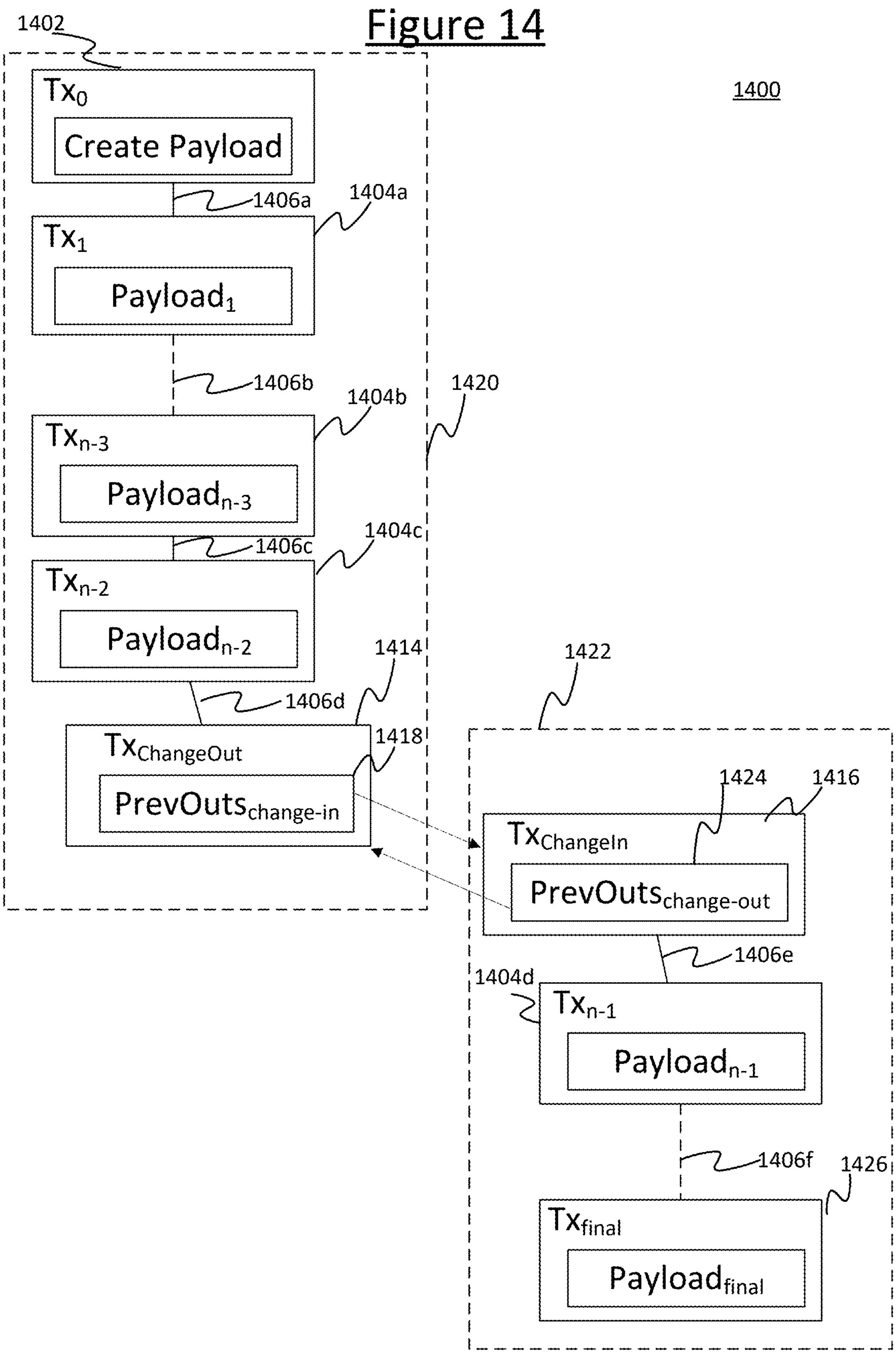
FIG. 14 is a schematic diagram depicting data structures for ordered, append-only data storage according to a sixth aspect.

Non-malleable Backward Change-out Referencing Referring to FIG. 14, a data structure 1400 according to a sixth aspect for creating an invariant forward reference 1418 from the change-out transaction 1414 to the change-in transaction 1416 and an invariant backward reference 1424 from the change-in transaction 1416 to the change-out transaction 1414.

FIG. 14 comprises similar numeral references and names for the features that are similar to those in the second, third, fourth, and/or fifth aspects. For example, each append transaction 1404*ba-d* and final transaction 1426 comprises a backwards spending reference 1406*a-f* to its preceding transaction. This is similar to the append transactions 704*a-d* and final transaction 726 as shown in FIG. 7A which also comprise a backwards spending reference 706*a-f* to its preceding transaction.

The forward reference 1418 from the change-out transaction 1414 to the change-in transaction 1416 is formed and operates in substantially the same way as the forward reference 1218 described in the fifth aspect.

The backward reference 1424 from the change-in transaction 1416 to the change-out transaction 1414 is based on the $\text{PrevOuts}_{change\text{-}out}$ set. The $\text{PrevOuts}_{change\text{-}out}$ set is constructed in the same way the $\text{PrevOuts}_{change\text{-}in}$ set is constructed as described in the fourth aspect, however it uses the transaction outputs consumed by the change-out transaction. Using a similar method of referencing as in the fourth aspect confers the same advantages, in particular relating to invariance. The $\text{PrevOuts}_{change\text{-}out}$ set optionally comprises only one of the at least one input.

Following the backward reference 1424 is conducted in much the same way also. Locate the transaction that spends the transactions and indexes present in the $\text{PrevOuts}_{change\text{-}out}$ set. This transaction is the change-out transaction.

Thus, the method of traversing forwards or backwards operates in substantially the same way as described in the fifth aspect, except when traversing backwards, the transaction id of the change-out transaction isn't used, the $\text{PrevOuts}_{change\text{-}out}$ reference is used as described above.

The method for adding a data item to a chain of dust and conditionally creating a new chain of dust as described in the second aspect operates substantially the same in this aspect except different references are used.

Rendezvous Transaction

According to an seventh aspect, the chain(s) of dust further comprise rendezvous transactions. Further details of rendezvous transaction are described in UK Patent Application No. 2020279.2 (filed in the name of nChain Holdings Limited on 21 Dec. 2020) and is hereby incorporated by reference.

The chain of dust operates substantially the same with regards to appending new data items (as described with reference to FIG. 8) except that the presence of rendezvous transactions will need to be accounted for with regard to the ancestor limit.

The chain of dust operates substantially the same with regards to traversing the chain(s) of dust (as described with reference to FIGS. 9 and 13), except an additional check in the transaction type checking step 912, 1312 is conducted. Here, if the current transaction is determined to be a rendezvous transaction, then it is iterated over similarly to an append transaction as it comprises the same dust references as the append transaction. The current transaction is identified as a rendezvous transaction based on the presence of multiple payloads as described with reference to the first aspect. As the rendezvous transaction comprises multiple dust inputs and outputs associated with different chains, the correct dust output is selected to continue traversal. The data layout 1800 of chains of dust comprising a rendezvous transaction 1802 is provided in FIG. 18. As there are multiple payloads, they are indexed in the rendezvous transaction by 'r' and the relevant outputs are provided at 2r and 2r+1.

If traversing forwards through the chain of dust and a rendezvous transaction is located, the method 900 as described with reference to FIG. 9 additionally comprises the following steps.

These steps would happen as a result of determining 912 that the current transaction is a rendezvous transaction. The relevant outputs of the rendezvous transaction are needed to continue traversing the chain.

First, the index 'r' is determined by locating an input that spends the dust outpoint of the preceding transaction. The output storing the data then is located at 2r+1 and the chain of dust output is located at 2r.

Next, with the chain of dust output located, the next transaction is located. The next transaction is located by obtaining the transaction that spends the outpoint ($TxID_{rendezvous}$, 2r) where TxID is the transaction id of the rendezvous transaction and is obtained by hashing the rendezvous transaction.

This next transaction is used as the current transaction for the start of the loop 910 of method 900 and the method continues.

Optionally, the data stored at 2r+1 has an operation conducted on it as is described with reference to the conducting an operation step 914 of the method 900 of FIG. 9.

Figure 18:
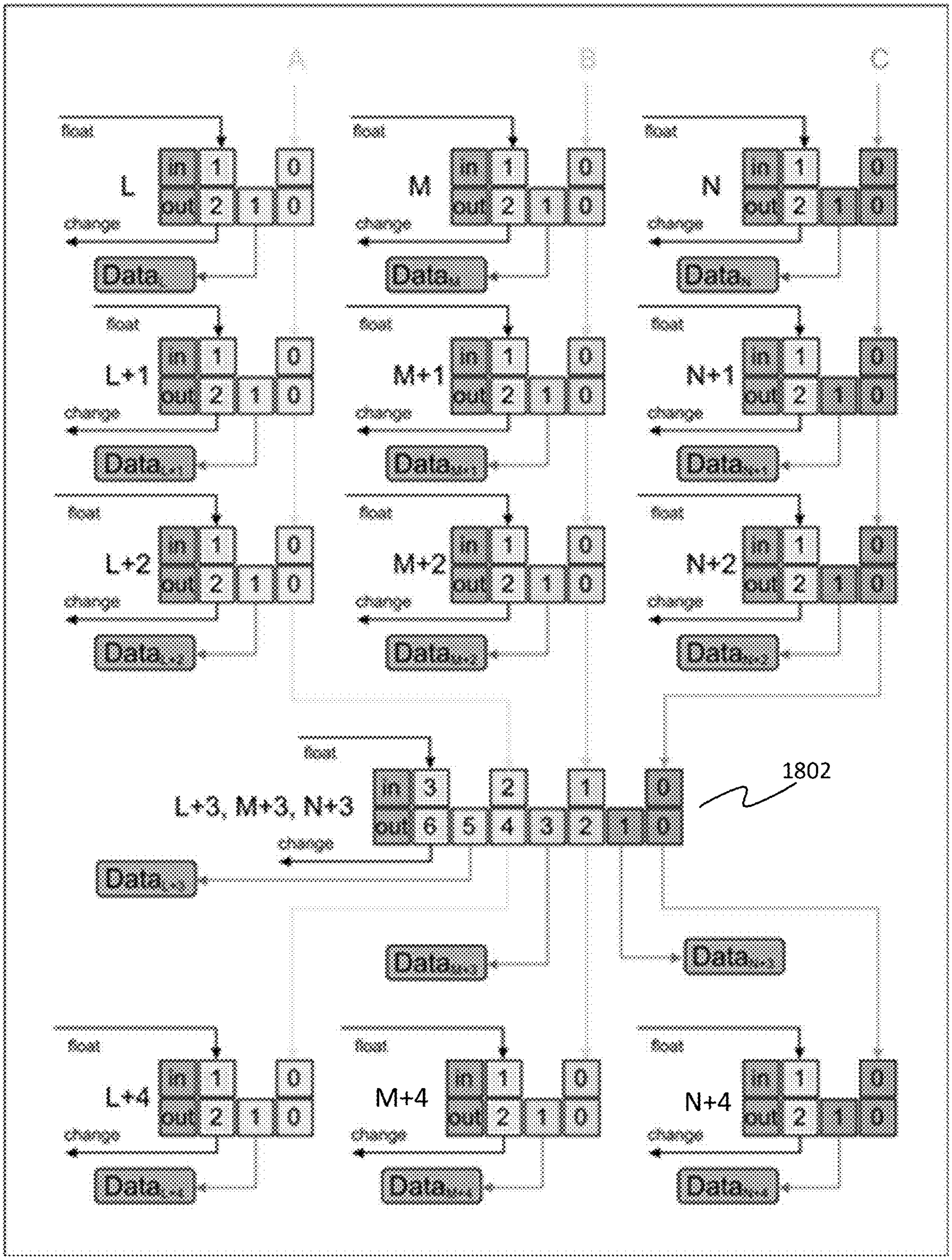
FIG. 18 is a schematic diagram depicting data structures for ordered, append-only data storage according to an eighth aspect.

By way of example, if chain L of FIG. 18 is being traversed forward, then the outputs relevant to the L chain are located at positions 4 and 5 with the data stored in 5 and the chain of dust is stored in 4 i.e. r=2. r is determined by looking at the dust output (the zeroth output) of the L+2 transaction (the transaction preceding the rendezvous transaction), and finding which input spends said output. The input is at index 2 of the rendezvous transaction in this case. With r=2 determined, the relevant outputs of the rendezvous transaction are at 2r=4 and 2r+1=5. To continue traversing to the L+4 transaction, the rendezvous transaction is hashed, and the transaction that spends the output ($TxID_{rendezvous}$, 4) will be L+4.

If traversing backwards through the chain of dust and a rendezvous transaction is located, the method 1300 as described with reference to FIG. 13 additionally comprises the following steps. These additional steps are similar to the forwards steps except in reverse.

Additional to the last steps of assigning $TxID_i=TxID_{i-1}$, the index part (referred to as 'k' here) of the dust outpoint is also stored in each loop iteration (and the initial steps) such that we additionally assign $k_i=k_{i-1}$.

These steps would happen as a result of determining 1312 that the current transaction is a rendezvous transaction. The relevant inputs of the rendezvous transaction are needed to continue traversing the chain.

First, 'r' is set to $k_i/2$. With the 'r' index, the input at index 'r' of the rendezvous transaction is obtained. Said input comprises $TxID_{i-1}$.

The loop continues from its starting step 1308 after assigning $TxID_i=TxID_{i-1}$.

Optionally, the data stored at 2r+1 (or alternatively described, at $k_{i+1}$) has an operation conducted on it as is described with reference to the conducting an operation step 1314 of the method 1300 of FIG. 13.

By way of example, again if chain L of FIG. 18 is being traversed in reverse, we determine that the current transaction is the rendezvous transaction 1802. From the previous iteration, the index $k_i$ is already known and stored (from the consumed outpoint in the preceding iteration). $k_i$ is 4 and is divided by 2 to get r=2. Thus, the relevant input of the rendezvous transaction is at index 2. The transaction id of the outpoint consumed by the input at index 2 is $TxID_{i-1}$. To continue traversing, transaction L+2 is located using its transaction id $TxID_{i-1}$.

Optionally, any data associated with the rendezvous transaction is obtained and stored for use by the traverser.

PrevOut Transaction Malleability

According to an eighth aspect, a method of overcoming malleability of the PrevOut inputs is described. The transactions that fund the change-in and change-out transactions (and are used as a reference, referenced as "funding transactions" for this aspect) as described in the aspects four and six are susceptible to the same malleability issues as described throughout the description. If the funding transactions were modified between being used as a reference and confirmed as a reference, then the chains may be irreversibly broken in at least one direction thereby preventing a traversal of the chains of dust.

Further, if these funding transactions are not confirmed on the blockchain, then they contribute to the unconfirmed ancestor count.

To overcome this malleability problem, a solution similar to that described with reference to aspect three is invoked. Ahead of approaching the ancestor limit (and therefore ahead of the necessity of using the funding transactions in the change-in and change-out transactions), the funding transactions are submitted to the blockchain and confirmed. By having the funding transactions already confirmed on the blockchain, they will be immutable.

Preferably, the change-out transaction is not submitted to the blockchain until the funding transaction(s) for the change-in transaction is/are confirmed. Preferably, the change-in transaction is not submitted to the blockchain until the funding transaction(s) for the change-out transaction is/are confirmed.

This has a further advantage in that the funding transactions will not contribute to the unconfirmed ancestor limit. Alternatively, or additionally, the threshold number is two less than the maximum unconfirmed ancestor limit to account for this funding transaction.

Optionally, the submitting of change-in funding transaction(s) such that it is confirmed and immutable on the blockchain is conducted by a Funding service associated with the services as described with reference to FIG. 16. The Funding service optionally maintains a number of funding transactions that are already confirmed on the blockchain ready for the data writing service to use them.

Data Writing Services

According to a further aspect, any one or more of the preceding aspect's data structures and methods may be used with a platform processor as described below for providing at least the ordered, append-only data storage as described above. This further aspect may be Platform as a Service (PaaS) and Software as a Service (SaaS) offering that advantageously enables rapid delivery of useful real world business and technical applications, such as management of software controlled technical systems or smart contracts, using a blockchain network such as the BSV blockchain.

Figure 15:
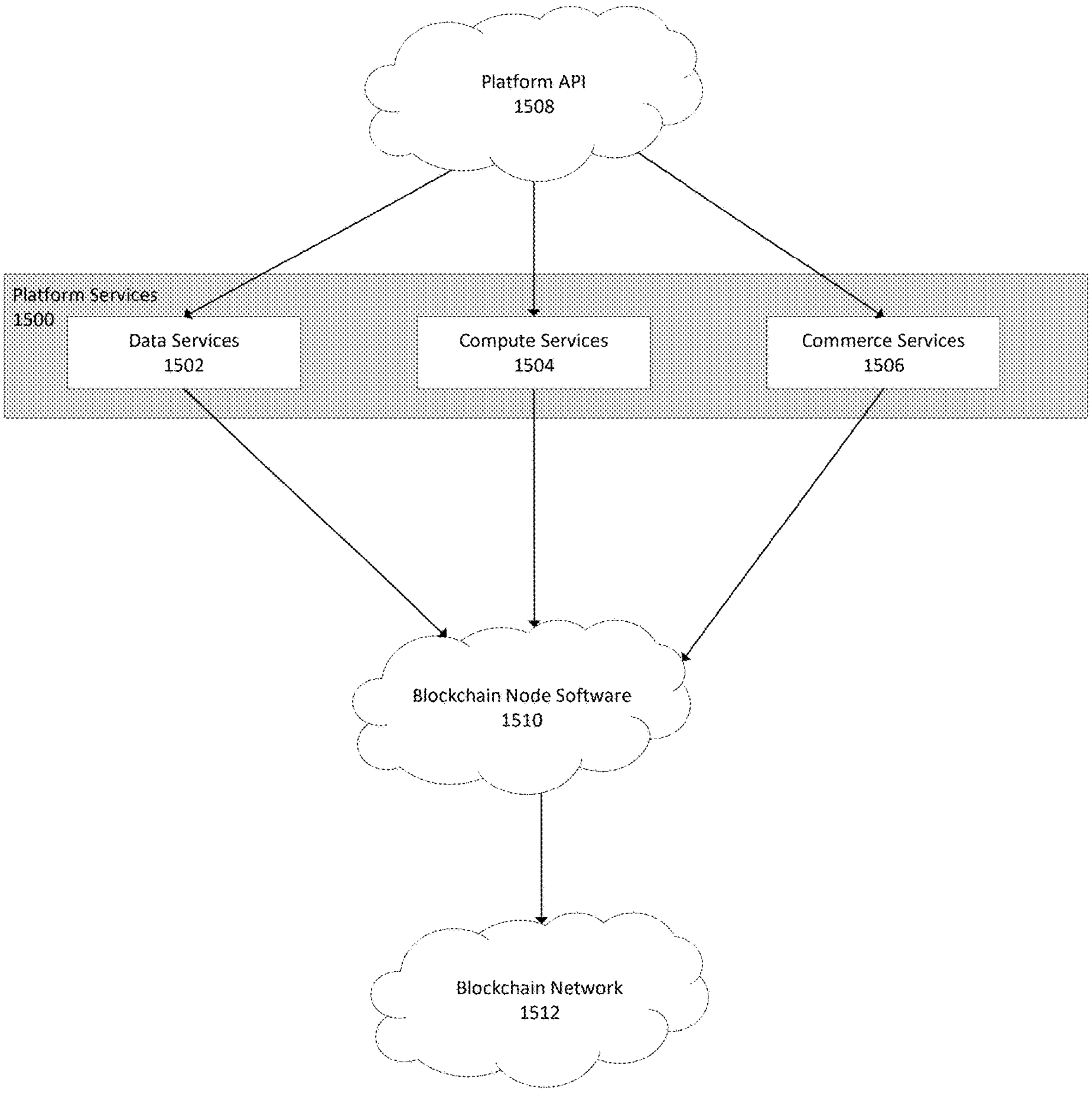
FIG. 15 is a schematic diagram, depicting an overview of a platform for a plurality of services associated with a blockchain, according to an aspect.

An overview of the platform services can be seen in FIG. 15 that shows a high-level schematic of the system. The platform service has a platform processor 1500 that provides an API 1508, via which the services may be accessed by one or more clients.

Platform Services 1500 as shown in this Figure are made up of three families of services and is aimed at allowing users and organisations to easily and securely make use of the advantages offered by the unique properties of a blockchain, without actually implementing any blockchain based software, knowledge, or libraries at the client end. These services are:

- Data Services 1502 that aim to simplify the usage of the chain as a commodity data ledger. The Data Services preferably use the data structures and methods provided herein for implementing data writing to and reading from the blockchain.
- Compute Services 1504 that aim to provide a generalised compute framework backed by a digital asset such as Bitcoin SV.
- Commerce Services 1506 that provide enterprise-class capabilities for transacting using a digital asset such as Bitcoin SV.

Requests may be received via or using the HTTPS protocol from a client at the API, as the API is implemented as a web service. The requested services are then implemented by the one or more service modules or processing resources 1502-1506 using underlying software 1510, such underlying software 1510 being associated with the blockchain, i.e. to implement resources, libraries and/or key-management wallet implementations for creating, processing and submitting transactions associated with the blockchain. Once processed, transactions can be submitted to the blockchain network 1512 (instead of the client implementing any such functionality or transaction libraries). At most, the client may or can implement a digital wallet or the like associated with cryptocurrency or some other digital asset, but this is not essential as the platform service 1500 may also be able to provide and manage the digital asset for the client.

Figure 16:
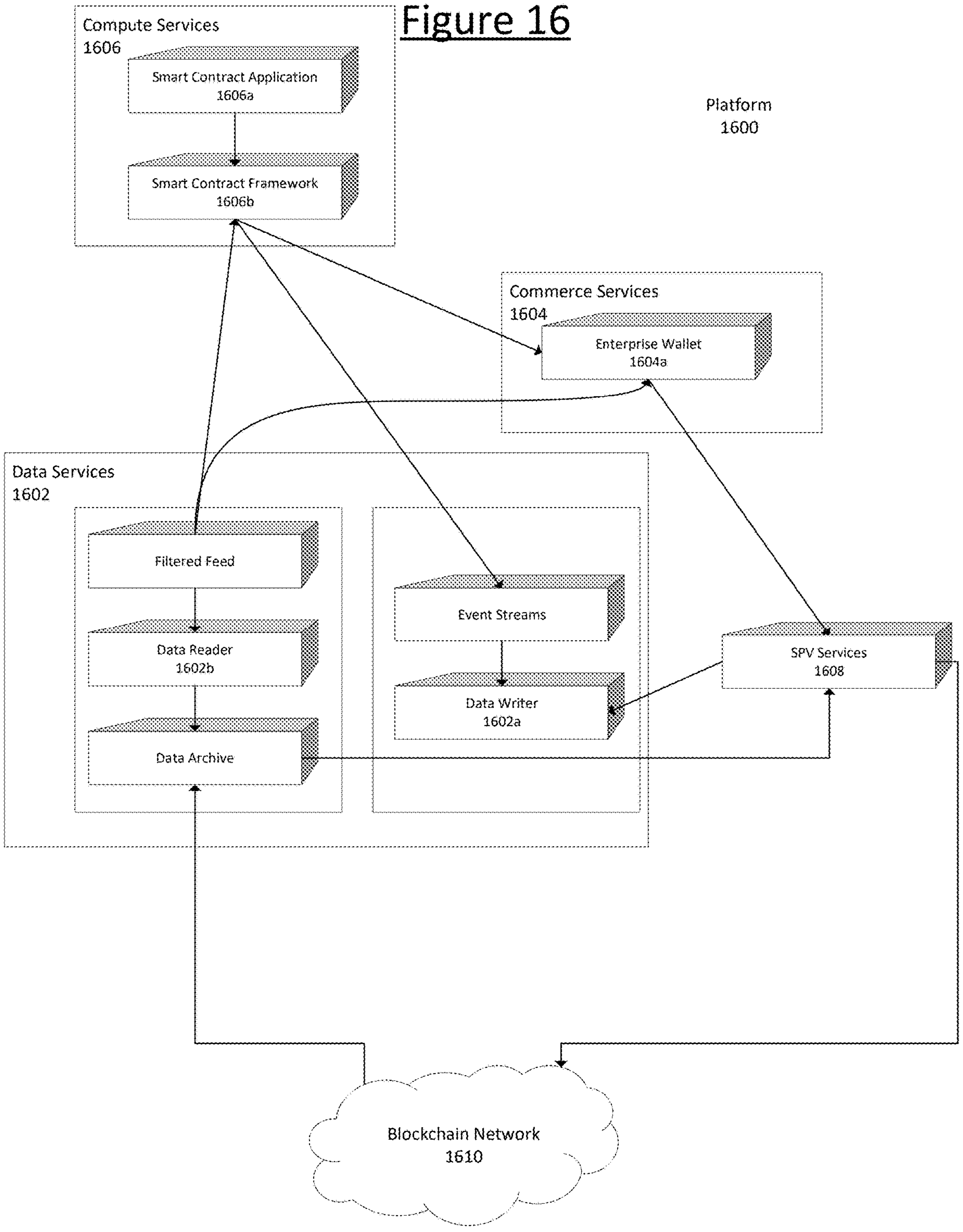
FIG. 16 is a schematic diagram, depicting the components of the platform of a plurality of services that are associated with a blockchain, according to an aspect.

FIG. 16 provides a more granular schematic view of the plurality of services associated with a blockchain, and which can be implemented by the platform 1600 that is associated with an API via which any one or more of the offered services can be accessed. As seen in this Figure, the data services 1602 may include a data writer 1602*a* and a data reader service 1602*b*. The data writer and reader services preferably use the data structures as described in the sixth aspect. Alternatively, any one or more of the other aspects described here are be used. Example usage of the data writer service 1602*a* is event streams as discussed briefly above. Further details of event streams are discussed with reference to FIGS. 4 to 8 of UK Patent Application No. 2002285.1 (filed in the name of nChain Holdings Limited on 19 Feb. 2020) and is hereby incorporated by reference. The data writer service 1602*a* enables clients to write data into the blockchain in a simple, secure and optimised manner. The data reader service 302*b* enables the clients to send queries, which returns data that is stored in the blockchain. This may be using filtered streams in which the client may pre-define the type of data that they wish to read from the blockchain on an ad hoc or periodic basis, i.e. within a certain timeframe, or those associated with a set of related or unrelated events or documents that are processed in the blockchain 1610. The data archive feature allows access to logs of previous transaction for a specified event or contract.

The compute services 1606 of the platform 1600 includes an application 1606*a* and framework 1606*b* associated with smart contracts, which in some embodiments may be represented as a state machine in the blockchain 1610. The compute services 1606 interacts with the data services 1602 as data will need to be input and results provided to a client for any such computation.

Commerce services 1604 are responsible for provision of enterprise-class capabilities via enterprise wallets 1604*a* for transacting over the blockchain 1610, based on best-in-class security practices and technologies. For example, in some embodiments, enterprise wallets may implement functionality to enable blockchain transaction processing when more than one person or user or account may need to sign off on a transaction meeting a defined criterion. i.e. associated with cryptocurrency of a large value above a certain predefined limit. An enterprise wallet may also include functionality to implement a threshold number and/or type of signatures to move large amounts of digital assets such as cryptocurrency or tokens representing another resource. The movement of these assets can then be represented on the blockchain following processing based on the criteria applied by such enterprise wallet implementation.

The SPV services 1608 (simplified payment verification) are applications that require information from the blockchain but do not include direct links to it, as they do not run a miner node. Such SPV service 1608 allows a lightweight client to verify that a transaction is included in a blockchain, without downloading the entire blockchain 1610.

Data Writing Device

Figure 17:
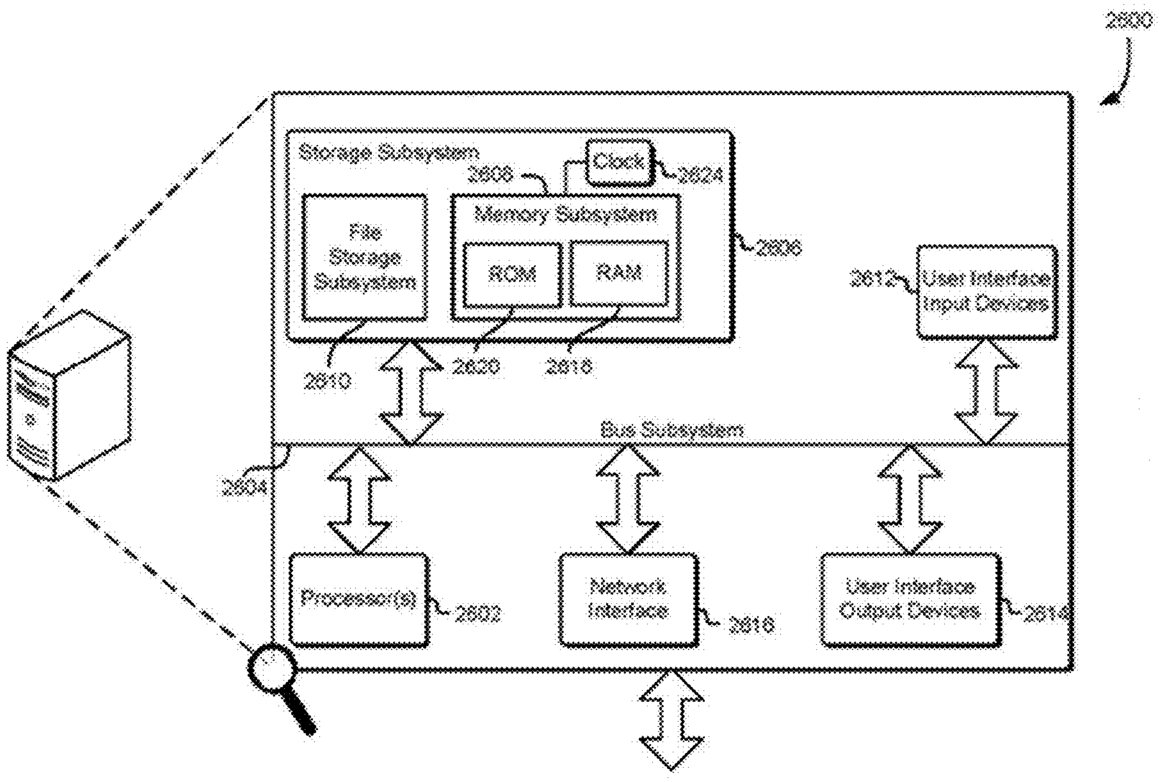
FIG. 17 is a schematic diagram, illustrating a computing environment in which various aspects and embodiments of the present disclosure can be implemented.

Turning now to FIG. 17, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured to be used as one or more components of DBMS of figure, or the computing device 2600 may be configured to be a client entity that is associated with a given user; the client entity making database requests for a database that is managed by the DBMS of FIG. 9. Thus, computing device 2600 may be a portable computing device, a personal computer, or any electronic computing device. As shown in FIG. 17, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilise multiple buses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term “input device” is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term “output device” is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 16 is intended only as a specific example for purposes of illustrating the preferred embodiment of the device. Many other configurations having more or fewer components than the system depicted in FIG. 16 are possible.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid-state memory, magnetic tape, a removable computer diskette, a random-access memory (RAM), a read-only memory (ROM), a rigid magnetic disc, and an optical disk, such as a CD-ROM, CD-R/W or DVD.

Unless specifically stated otherwise, as apparent from the following discussion, it is appreciated that throughout the description, discussions utilizing terms such as “determining”, “providing”, “calculating”, “computing,” “identifying”, “combining”, “establishing”, “sending”, “receiving”, “storing”, “estimating”, “checking”, “obtaining” or the like, refer to the actions and processes of a computer system, or similar electronic computing device, that manipulates and transforms data represented as physical (electronic) quantities within the computer system’s registers and memories into other data similarly represented as physical quantities within the computer system memories or registers or other such information storage, transmission or display devices.

Enumerated Example Embodiments

The present disclosure is hereby discussed based on the following clauses that are related to the above aspects, which are provided herein as exemplary embodiments for better explaining, describing and understanding of the aspects and embodiments.

1. A computer implemented data structure associated with a blockchain, comprising:
   a first transaction comprising:
      a first output; and
      a representation of a first data item,
   a second transaction comprising:
      a further representation of the first data item;
      a representation of a second data item;
      a first input associated the first output; and
      a second output.

2. A computer implemented data structure according to clause 1, wherein the first data item is metadata and a seed.

3. A computer implemented data structure according to clause 2, wherein the representation of the first item comprises the metadata comprising the seed.

4. A computer implemented data structure according to clause 2 or 3, wherein the further representation of the first item comprises the seed.

5. A computer implemented data structure according to clause 1, wherein the first representation of the first data item comprises a hash of the data item.

6. A computer implemented data structure according to clause 1, wherein the first representation of the first data item comprises the data item.

7. A computer implemented data structure according to clause 5 or 6, wherein the first transaction comprises a preimage that comprises the first representation of the first data item.

8. A computer implemented data structure according to clause 7, wherein the further representation of the first data structure comprises a hash of the preimage of the first transaction.

9. A computer implemented data structure according to any one or more of clauses 1 to 8, wherein the second transaction further comprises a reference to the first transaction.

10. A computer implemented data structure according to any one or more of clauses 1 to 9 further comprising:
   a transaction of a first type comprising a first reference to a transaction of a second type, and
   the transaction of the second type.

11. A computer implemented data structure according to clause 10, wherein the first reference is stored in an output of the transaction of the first type.

12. A computer implemented data structure associated with a blockchain, comprising:
   a transaction of a first type comprising an output comprising a first reference to a transaction of a second type, and
   the transaction of the second type.

13. A computer implemented data structure according to any one or more of clauses 10 to 12, wherein the first reference is an invariant reference.

14. A computer implemented data structure according to clause 13, wherein the first reference is based on an invariant feature of the transaction of the second type.

15. A computer implemented data structure according to any one or more of clauses 10 to 14, wherein the first reference comprises the transaction id of the transaction of the second type.

16. A computer implemented data structure according to any one or more of clauses 10 to 15, wherein the transaction of the second type comprises at least one input and the first reference is based on at least one of the at least one input to the transaction of the second type.

17. A computer implemented data structure according to any one or more of clauses 10 to 16, wherein the transaction of the second type comprises a second reference.

18. A computer implemented data structure according to clause 17, wherein the second reference is stored in an output of the transaction of the second type.

19. A computer implemented according to clause 17 or 18, wherein the second reference comprises a transaction id of the transaction of the first type.

20. A computer implemented data structure according to clause 17 or 18, wherein the wherein the second reference is an invariant reference.

21. A computer implemented data structure according to clause 20, wherein the second reference is based on an invariant feature of the transaction of the first type.

22. A computer implemented data structure according to any one or more of clauses 17, 18, 20, or 21, wherein the transaction of the first type comprises at least one input and the second reference is based on at least one of the at least one input of the transaction of the first type.

23. A computer implemented data structure according to clause 16 or 22, wherein the reference comprising the at least one input takes the form of a transaction outpoint.

24. A computer implemented data structure associated with a blockchain, comprising:
   a transaction of a first type comprising:
      a first reference to a transaction of a second type; and
      at least one input,
   the transaction of the second type comprising:
      a second reference to the transaction of the first type; and
      at least one input, and
   wherein the first reference is based on at least one of the at least one input to the transaction of the second type and the second reference is based on at least one of the at least one input to the transaction of the first type.

25. A computer implemented data structure associated with a blockchain, comprising:
   a transaction of a first type comprising:
      a first reference to a transaction of a second type; and
      at least one input,
   the transaction of the second type comprising:
      a second reference to the transaction of the first type; and
      at least one input, and
   wherein the first reference comprises a transaction id of the transaction of the second type and the second reference is based on at least one of the at least one input to the transaction of the first type.

26. A computer implemented data structure associated with a blockchain, comprising:
   a transaction of a first type comprising:
      a first reference to a transaction of a second type; and
      at least one input,
   the transaction of the second type comprising:
      a second reference to the transaction of a first type; and
      at least one input, and
   wherein the first reference is based on at least one of the at least one input to the transaction of the second type and the second reference comprises a transaction id of the transaction of the first type.

27. A computer implemented method associated with a set of transactions in a blockchain system, the method comprising the steps:

receiving a request, the request triggering a representation of a data item to be stored on the blockchain, obtaining a latest transaction in the set of transactions, creating a new blockchain transaction comprising:

an input associated with an output from the latest transaction;

an output;

the representation of the data item to be stored on the blockchain; and a reference to the latest transaction, submitting the transaction to the blockchain.

28. A computer implemented method according to clause 27, wherein the reference to the latest transaction is a hash of an invariant feature of the latest transaction.

29. A computer implemented method according to clause 28, wherein the latest transaction comprises a preimage and the reference to the latest transaction is a hash of the preimage of the latest transaction.

30. A computer implemented method according to any one or more of clauses 27 to 29, wherein the new blockchain transaction further comprises a reference to an initial transaction in the set of transactions.

31. A computer implemented method according to clause 30, wherein the reference to the initial transaction in the set of transactions is based on the initial transaction.

32. A computer implemented method according to clause 30 or 31, wherein the reference to the initial transaction is a hash of the initial transaction.

33. A computer implemented method according to any one or more of clauses 27 to 32, further comprising the steps:

creating a transaction of a second type, creating a transaction of a first type comprising an input associated with a transaction output from the latest transaction in the set of transactions, submitting the transaction of the second type to the blockchain, and submitting the transaction of the first type to the blockchain.

34. A computer implemented method associated with a set of transactions in a blockchain system, the method comprising the steps:

creating a transaction of a second type, creating a transaction of a first type comprising at least one input associated with an output from a latest transaction in the set of transactions, submitting the transaction of the second type to the blockchain, and submitting the transaction of the first type to the blockchain.

35. A computer implemented method according to clause 33 or 34, further comprising the steps:

determining a total number of transactions in a subset of the set of transactions, and determining whether the total number of transactions in the subset of transactions is equal to or greater than a threshold.

36. A computer implemented method according to clause 35, wherein membership of the subset of transactions is defined by whether the transaction has been confirmed on the blockchain.

37. A computer implemented method according to clause 35 or 36, wherein membership of the subset of transactions is defined by a spending relationship with any transaction in the set of transactions.

38. A computer implemented method according to clause 35 or 36, wherein membership of the subset of transactions is additionally defined by the threshold.

39. A computer implemented method according to any one or more of clauses 35 to 38, wherein the subset of transactions comprises a first chain of transactions.

40. A computer implemented method according to clause 39, where the subset of transactions is the first chain of transactions.

41. A computer implemented method according to clause 39 or 40, wherein the first chain of transactions is constructed such that, except for the first, each transaction in the subset comprises a reference to the previous transaction in the chain.

42. A computer implemented method according to clause 41, wherein the reference to the previous transaction is an input associated with a transaction output from the previous transaction.

43. A computer implemented method according to any one or more of clauses 40 to 42, wherein the set of transactions comprises multiple subsets of transactions.

44. A computer implemented method according to clause 43, wherein the set of transactions comprises further chains of transactions.

45. A computer implemented method according to any one or more of clauses 35 to 44, wherein the threshold is based on an ancestor limit.

46. A computer implemented method according to clause 45, wherein the threshold is one less than the ancestor limit.

47. A computer implemented method according to any one or more of clauses 35 to 46, wherein the steps of creating and submitting the transaction of the second type and transaction of the first type are conducted based on a comparison between the total number of transactions in the subset of transactions and the threshold.

48. A computer implemented method according to clause 47, wherein the steps of creating and submitting the transaction of the second type and transaction of the first type are conducted based on whether the total number of transactions in the subset of transactions is equal to or greater than the threshold.

49. A computer implemented method according to any one or more of clauses 33 to 48, wherein the transaction of the first type comprises a first reference to the transaction of the second type.

50. A computer implemented method according to clause 49, wherein the first reference is an invariant reference.

51. A computer implemented method according to clause 50, wherein the first reference is based on an invariant feature of the transaction of the second type.

52. A computer implemented method according to any one or more of clauses 49 to 51, wherein the first reference comprises a transaction id of the transaction of the second type.

53. A computer implemented method according to any one or more of clauses 33 to 52, wherein the transaction of the second type is confirmed on the blockchain before submitting the transaction of the first type.

54. A computer implemented method according to any one or more of clauses 49 to 53, wherein the transaction of the second type comprises at least one input and the first reference is based on at least one of the at least one input of the transaction of the second type.

55. A computer implemented method according to any one or more of clauses 33 to 54, wherein the transaction of the second type comprises a second reference to a transaction in the set of transactions.

56. A computer implemented method according to clause 55, wherein the second reference is a reference to an initial transaction in the set of transactions.

57. A computer implemented method according to clause 56, wherein the reference to the initial transaction comprises a transaction id of the initial transaction.

58. A computer implemented method according to any one or more of clauses 55 to 57, wherein the second reference is an invariant reference.

59. A computer implemented method according to clause 58, wherein the second reference is based on an invariant feature of the transaction of the first type.

60. A computer implemented method according to any one or more of clauses 55 to 59, wherein the second reference comprises a transaction id of the transaction of the first type.

61. A computer implemented method according to clause 58 or 59, the second reference is based on at least one of the at least one input of the transaction of the first type.

62. A computer implemented method according to clause 54 or 61, wherein the reference based on at least one of the at least one input takes the form of a transaction outpoint.

63. A computer implemented method for traversing forward through a set of blockchain transactions, comprising the steps:

(a) obtaining a current transaction in the set of transactions, (b) determining the current transaction is a transaction of a first type and based on the determination, conducting the following steps (i), (ii), and (iii):

i. obtaining a reference to a transaction of a second type based on the transaction of the first type;

ii. obtaining the transaction of the second type based on the reference to the transaction of the second type; and iii. continuing to step (c) with the transaction of the second type as the current transaction, (c) obtaining a current transaction identifier, (d) obtaining a further transaction that references the current transaction identifier, and (e) conducting steps (b), (c), (d), and (e) starting with the further transaction as the current transaction thereby creating a loop.

64. A computer implemented method according to clause 63, wherein the reference to the transaction of the second type is stored in the transaction of the first type and the reference is obtained by extracting the reference from the transaction of the first type.

65. A computer implemented method according to clause 63 or 64, wherein if the reference to the transaction of the second type comprises the transaction id of the transaction of the second type, then the step of obtaining the transaction of the second type comprises:

locating a transaction in the blockchain or within a blockchain network node with the transaction id the same as the transaction id of the transaction of the second type.

66. A computer implemented method according to clause 63 or 64, wherein if the reference to the transaction of the second type comprises a set of at least one input to the transaction of the second type, then the step of obtaining the transaction of the second type comprises:

locating a transaction in a blockchain or within a blockchain network node with at least one input of the input set as is comprised in the reference to the transaction of the second type.

67. A computer implemented method according to any one or more of clauses 63 to 66, further comprising:

determining the current transaction is not the transaction of a second type and based on the determination, conducting an operation on a data payload associated with the current transaction, and continuing to step (c).

68. A computer implemented method according to any one or more of clauses 63 to 67, wherein the current transaction is determined to not be a transaction of a first type based on the contents of the current transaction.

69. A computer implemented method according to clause 68, the current transaction is determined to not be the transaction of the first type based on the size of an output of the current transaction.

70. A computer implemented method according to clause 67, wherein conducting an operation on the data payload comprises:

storing a hash based on a data payload of a preceding transaction, extracting, from the current transaction, a reference to the data payload of the preceding transaction, and verifying that the hash based on the data payload of the preceding transaction and the reference to the data payload of the preceding transaction are valid.

71. A computer implemented method according to clause 70, wherein the reference to the preceding transaction is a further hash of the payload of the preceding transaction.

72. A computer implemented method according to clause 70 or 71, wherein the step of verifying comprises determining whether the hash of the data payload of the preceding transaction and the reference to the data payload of the preceding transaction are the same.

73. A computer implemented method according to any one or more of clauses 63 to 72, further comprising the steps to be executed before step (a):

obtaining an initial transaction in the set of transactions, verifying the initial transaction comprises a seed value, hashing the initial transaction to obtain an initial transaction identifier, obtaining a second transaction that references the first transaction identifier, verifying the second transaction comprises a seed value and that it is the same as the seed value of the first transaction, hashing the second transaction to obtain a second transaction identifier, obtaining a third transaction that references the second transaction identifier, and move to step (b) with the third transaction as the current transaction.

74. A computer implemented method according to any one or more of clauses 63 to 73, further comprising the step to be executed after step (a):

ending the traversal based on whether the current transaction is a final transaction, wherein determining whether the current transaction is a final transaction is based on data comprised in the current transaction.

75. A computer implemented method according to any one or more of clauses 63 to 74, further comprising the step to be executed after step (a):

determining the current transaction is a transaction of a third type and based on the determination, conducting the following steps (i), (ii), (iii), and (iv):

i. obtaining an index to the input that comprises a reference to the preceding transaction, ii. obtaining the output associated with the input that comprises a reference to the preceding transaction, iii. obtaining the next transaction based on the obtained output, and iv. continuing to step (c) with the next transaction as the current transaction.

76. A computer implemented method for traversing backwards through a set of blockchain transactions, comprising the steps:

(a) obtaining a current transaction in the set of transactions, (b) determining the current transaction is a transaction of a second type and based on the determination, conducting the following steps (i), (ii), and (iii):

i. obtaining a reference to a transaction of a first type based on the transaction of the second type;

ii. obtaining the transaction of the first type based on the reference to the transaction of the first type; and iii. continuing to step (c) with the transaction of the first type as the current transaction, (c) obtaining a transaction identifier of the preceding transaction from the current transaction, (d) obtaining a preceding transaction based on the transaction identifier of the preceding transaction, (e) conducting steps (b), (c), (d), and (e) starting with the preceding transaction as the current transaction thereby creating a loop.

77. A computer implemented method according to clause 76, wherein the reference to the transaction of the first type is stored in the transaction of the second type and the reference is obtained by extracting the reference from the transaction of the second type.

78. A computer implemented method according to clause 76 or 77, wherein if the reference to the transaction of the first type comprises the transaction id of the transaction of the first type, then the step of obtaining the transaction of the first type comprises:

locating a transaction in a blockchain or within a blockchain node with the transaction id the same as the transaction id of the transaction of the first type.

79. A computer implemented method according to clause 76 or 77, wherein if the reference to the transaction of the first type comprises a set of at least one input to the transaction of the first type, then the step of obtaining the transaction of the first type comprises:

locating a transaction in the blockchain or within a blockchain node with at least one input of the input set as is comprised in the reference to the transaction of the first type.

80. A computer implemented method according to any one or more of clauses 76 to 79, further comprising the step:

determining the current transaction is not the transaction of the first type, and based on the determination, conducting an operation on a data payload associated with the current transaction and continuing to step (c).

81. A computer implemented method according to any one or more of clauses 76 to 80, wherein then the current transaction is determined to not be the transaction of the second type based on the contents of the current transaction.

82. A computer implemented method according to clause 81, wherein the current transaction is determined to not be a change-in transaction based on the whether the current transaction comprises a data payload comprising a preimage.

83. A computer implemented method according to any one of clauses 76 to 82, wherein conducting an operation on the data payload comprises:

storing a hash based on data payload of a preceding transaction, extracting, from the current transaction, a reference to the data payload of the preceding transaction, and verifying that the hash based on the data payload of the preceding transaction and the reference to the data payload of the preceding transaction are valid.

84. A computer implemented method according to clause 83, wherein the reference to the preceding transaction is a further hash of the payload of the preceding transaction.

85. A computer implemented method according to clause 83 or 84, wherein the step of verifying comprises determining whether the hash of the data payload of the preceding transaction and the reference to the data payload of the preceding transaction are the same.

86. A computer implemented method according to any one or more of clauses 76 to 85, further comprising the steps to be executed before step (a):

obtaining a final transaction in the set of transactions, obtaining a transaction id of an initial transaction in the set of transactions from the final transaction, hashing the final transaction to obtain a final transaction identifier, obtaining a second transaction that references the final transaction identifier, and moving to step (b) with the second transaction as the current transaction.

87. A computer implemented method according to clause 86, further comprising the step to be executed after step (a):

ending the traversal based on whether the transaction id of the current transaction equal to the initial transaction id.

88. A computer implemented method according to any one or more of clauses 76 to 87, further comprising the step to be executed after step (a):

ending the traversal based on whether the current transaction is an/the initial transaction, wherein determining whether the current transaction is the initial transaction is based on data comprised in a data payload of the current transaction.

89. A computer implemented method according to any one or more of clauses 76 to 88, further comprising the step to be executed after step (a):

determining the current transaction is a transaction of a third type and based on the determination, conducting the following steps (i), (ii), (iii), and (iv):

i. obtaining an index to an input of the current transaction, ii. obtaining a reference to the preceding transaction based on the obtained input of the current transaction, iii. obtaining the preceding transaction based on the reference, and iv. continuing to step (c) with the preceding transaction as the current transaction.

90. A computer implemented method for traversing forward through a set of blockchain transactions, comprising the steps:

(a) obtaining a current transaction in the set of transactions, (b) determining the current transaction is a transaction of a third type and based on the determination, conducting the following steps (i), (ii), (iii), and (iv):

i. obtaining an index to the input that comprises a reference to the preceding transaction;

ii. obtaining the output associated with the input that comprises a reference to the preceding transaction;

iii. obtaining the next transaction based on the obtained output; and iv. continuing to step (c) with the next transaction as the current transaction, (c) obtaining a current transaction identifier, (d) obtaining a further transaction that references the current transaction identifier, and (e) conducting steps (b), (c), (d), and (e) starting with the further transaction as the current transaction thereby creating a loop.

91. A computer implemented method for traversing backwards through a set of blockchain transactions, comprising the steps:

(a) obtaining a current transaction in the set of transactions, (b) determining the current transaction is a transaction of a third type and based on the determination, conducting the following steps (i), (ii), (iii), (iv):

i. obtaining an index to an input of the current transaction;

ii. obtaining a reference to the preceding transaction based on the obtained input of the current transaction;

iii. obtaining the preceding transaction based on reference; and iv. continuing to step (c) with the preceding transaction as the current transaction, (c) obtaining a transaction identifier of the preceding transaction from the current transaction, (d) obtaining a preceding transaction based on the transaction identifier of the preceding transaction, (e) conducting steps (b), (c), (d), and (e) starting with the preceding transaction as the current transaction thereby creating a loop.

92. A computing device comprising a processor and memory, the memory including executable instructions that, as a result of execution by the processor, causes the device to perform the computer-implemented method as set out in any one or more of clauses 27 to 62.

93. A computer system comprising:

a data writing device according to clause 92, and a computing device configured to submit requests comprising data to the data writing device.

94. A computer-readable storage medium having stored thereon executable instructions that, as a result of being executed by a processor of a computer, cause the computer to perform the method of any one or more of clauses 27 to 62.

95. A computing device comprising a processor and memory, the memory including executable instructions that, as a result of execution by the processor, causes the device to perform the computer-implemented method as set out in any one or more of clauses 63 to 75.

96. A computer-readable storage medium having stored thereon executable instructions that, as a result of being executed by a processor of a computer, cause the computer to perform the method of any one or more of clauses 63 to 75.

97. A computing device comprising a processor and memory, the memory including executable instructions that, as a result of execution by the processor, causes the device to perform the computer-implemented method as set out in any one or more of clauses 76 to 91.

98. A computer-readable storage medium having stored thereon executable instructions that, as a result of being executed by a processor of a computer, cause the computer to perform the method of any one or more of clauses 76 to 91.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both. As used herein "(s)" following a noun means the plural and/or singular forms of the noun. The singular reference of an element does not exclude the plural reference of such elements and vice-versa.

It is to be understood that the above description is intended to be illustrative, and not restrictive. Many other implementations will be apparent to those of skill in the art upon reading and understanding the above description. Although the disclosure has been described with reference to specific example implementations, it will be recognized that the disclosure is not limited to the implementations described but can be practiced with modification and alteration within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A non-transitory computer readable medium comprising a computer implemented data structure associated with a blockchain, wherein the data structure comprises:

a first chain of transactions comprising a plurality of transactions including a first blockchain transaction, wherein the plurality of transactions is at an ancestor limit, wherein the first blockchain transaction comprises:

at least one input associated with an output from a latest transaction in the first chain of transactions, thereby establishing a spending relationship, and an output comprising a data payload including a first reference to a second blockchain transaction, wherein the first reference is an invariant reference and/or comprises a transaction id of the second blockchain transaction, and a second chain of transactions, comprising:

a second blockchain transaction, wherein the second blockchain transaction is an initial transaction in the second chain of transactions, and comprises:

an output comprising a data payload including a second reference to a transaction in the first chain of transactions that is previous to the latest transaction, wherein the first blockchain transaction and the second blockchain transaction are not linked by a spending relationship, thereby creating a break in a spending-dependent chain of transactions to overcome an ancestor limit of the blockchain, and the first chain of transactions and the second chain of transactions are connected, such that the first reference enables forward traversal through the first and second chains of transactions; and the second reference enables backward traversal through the first and second chains of transactions.

2. The computer implemented data structure of claim 1, wherein the first reference is based on an invariant feature of the second blockchain transaction.

3. The computer implemented data structure of claim 1, wherein the second blockchain transaction comprises at least one input and the first reference is based on at least one of the at least one input to the second blockchain transaction.

4. The computer implemented data structure of claim 1, wherein the data payload based on the second reference is stored in an output of the second blockchain transaction.

5. The computer implemented data structure of claim 1, wherein the second reference comprises a transaction id of the first blockchain transaction.

6. The computer implemented data structure of claim 1, wherein the second reference is an invariant reference.

7. The computer implemented data structure of claim 6, wherein the second reference is based on an invariant feature of the first blockchain transaction.

8. The computer implemented data structure of claim 1, wherein the first blockchain transaction comprises at least one input and the second reference is based on at least one of the at least one input of the first blockchain transaction.

9. The computer implemented data structure of claim 3, wherein the reference comprising the at least one input takes the form of a transaction outpoint.

10. A computer implemented method associated with a first chain of transactions in a blockchain system, wherein the first chain of transactions comprises a plurality of transactions including a first blockchain transaction, wherein the plurality of transactions is at an ancestor limit, the method comprising the steps:
- creating a second blockchain transaction to be an initial transaction in a second chain of transactions,
- creating the first blockchain transaction comprising:
  - at least one input associated with an output from a latest transaction in the first chain of transactions, thereby establishing a spending relationship, and
  - an output comprising a data payload including a first reference to the second blockchain transaction, wherein the first reference is an invariant reference and/or comprises a transaction id of the second blockchain transaction,
- submitting the second blockchain transaction to the blockchain, and
- submitting the first blockchain transaction to the blockchain;
- wherein the second blockchain transaction comprises an output comprising a data payload including a second reference to a transaction in the first chain of transactions that is previous to the latest transaction,
- wherein the first blockchain transaction and the second blockchain transaction are not linked by a spending relationship, thereby creating a break in a spending-dependent chain of transactions to overcome an ancestor limit of the blockchain, and
- the first chain of transactions and the second chain of transactions are connected, such that
- the first reference enables forward traversal through the first and second chains of transactions; and the second reference enables backward traversal through the first and second chains of transactions.

11. The computer implemented method of claim 10, wherein the first reference is based on an invariant feature of the second blockchain transaction.

12. The computer implemented method of claim 11, wherein the second blockchain transaction comprises at least one input and the first reference is based on at least one of the at least one input of the second blockchain transaction.

13. The computer implemented method of claim 10, wherein the second reference is a reference to an initial transaction in the first chain of transactions.

14. The computer implemented method of claim 13, wherein the reference to the initial transaction comprises a transaction id of the initial transaction.

15. The computer implemented method of claim 10, wherein the second reference is an invariant reference.

16. The computer implemented method of claim 15, wherein the second reference is based on an invariant feature of the first blockchain transaction.

17. The computer implemented method of claim 10, wherein the second reference comprises a transaction id of the first blockchain transaction.

18. The computer implemented method of claim 15, wherein the second reference is based on at least one of the at least one input of the first blockchain transaction.

19. The computer implemented method of claim 10, wherein the first reference based on at least one of the at least one input takes the form of a transaction outpoint.

20. A computing device comprising a processor and memory, the memory including executable instructions that, as a result of execution by the processor, causes the computing device to perform a computer-implemented method associated with a first chain of transactions in a blockchain system, wherein the first chain of transactions comprises a plurality of transactions including a first blockchain transaction, wherein the plurality of transactions is at an ancestor limit, the computer-implemented method comprising the steps:
- creating a second blockchain transaction to be an initial transaction in a second chain of transactions,
- creating the first blockchain transaction comprising:
  - at least one input associated with an output from a latest transaction in the first chain of transactions, thereby establishing a spending relationship, and
  - an output comprising a data payload including a first reference to the second blockchain transaction, wherein the first reference is an invariant reference and/or comprises a transaction id of the second blockchain transaction,
- submitting the second blockchain transaction to the blockchain, and
- submitting the first blockchain transaction to the blockchain,
- wherein the second blockchain transaction comprises an output comprising a data payload including a second reference to a transaction in the first chain of transactions that is previous to the latest transaction,
- wherein the first blockchain transaction and the second blockchain transaction are not linked by a spending relationship, thereby creating a break in a spending-dependent chain of transactions to overcome an ancestor limit of the blockchain, and
- the first chain of transactions and the second chain of transactions are connected, such that
- the first reference enables forward traversal through the first and second chains of transactions; and the second reference enables backward traversal through the first and second chains of transactions.

21. A non-transitory computer-readable storage medium having stored thereon executable instructions that, as a result of being executed by a processor of a computer, cause the computer to perform a method associated with a first chain of transactions in a blockchain system, wherein the first chain of transactions comprises a plurality of transactions including a first blockchain transaction, wherein the plurality of transactions is at an ancestor limit, the method comprising the steps:
- creating a second blockchain transaction to be an initial transaction in a second chain of transactions,
- creating the first blockchain transaction comprising:
  - at least one input associated with an output from a latest transaction in the first chain of transactions, thereby establishing a spending relationship, and an output comprising a data payload including a first reference to the second blockchain transaction, wherein the first reference is an invariant reference and/or comprises a transaction id of the second blockchain transaction, submitting the second blockchain transaction to the blockchain, and submitting the first blockchain transaction to the blockchain, wherein the second blockchain transaction comprises an output comprising data payload including a second reference to a transaction in the first chain of transactions that is previous to the latest transaction, wherein the first blockchain transaction and the second blockchain transaction are not linked by a spending relationship, thereby creating a break in a spending-dependent chain of transactions to overcome an ancestor limit of the blockchain, and the first chain of transactions and the second chain of transactions are connected, such that the first reference enables forward traversal through the first and second chains of transactions; and the second reference enables backward traversal through the first and second chains of transactions.

* * * * *